(12) United States Patent
Park et al.

(10) Patent No.: US 12,278,972 B2
(45) Date of Patent: Apr. 15, 2025

(54) IMAGE CODING/DECODING METHOD AND DEVICE FOR SELECTIVELY SIGNALING FILTER AVAILABILITY INFORMATION, AND METHOD FOR TRANSMITTING BITSTREAM

(71) Applicant: LG ELECTRONICS INC., Seoul (KR)

(72) Inventors: Nae Ri Park, Seoul (KR); Jung Hak Nam, Seoul (KR); Hyeong Moon Jang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 175 days.

(21) Appl. No.: 17/797,953

(22) PCT Filed: Feb. 15, 2021

(86) PCT No.: PCT/KR2021/001856
§ 371 (c)(1),
(2) Date: Aug. 5, 2022

(87) PCT Pub. No.: WO2021/162494
PCT Pub. Date: Aug. 19, 2021

(65) Prior Publication Data
US 2023/0080116 A1    Mar. 16, 2023

Related U.S. Application Data
(60) Provisional application No. 62/977,060, filed on Feb. 14, 2020.

(51) Int. Cl.
*H04N 19/174*    (2014.01)
*H04N 19/117*    (2014.01)
(Continued)

(52) U.S. Cl.
CPC ......... *H04N 19/174* (2014.11); *H04N 19/117* (2014.11); *H04N 19/119* (2014.11);
(Continued)

(58) Field of Classification Search
CPC .. H04N 19/117; H04N 19/119; H04N 19/172; H04N 19/174; H04N 19/46; H04N 19/70
See application file for complete search history.

(56) References Cited

U.S. PATENT DOCUMENTS

| 10,129,567 B2 * | 11/2018 | Jeong | H04N 19/593 |
| 2019/0281285 A1 * | 9/2019 | Piao | H04N 19/176 |
| 2022/0279179 A1 * | 9/2022 | Kim | H04N 19/174 |

FOREIGN PATENT DOCUMENTS

| KR | 1020140081882 A | 7/2014 |
| KR | 1020140085541 A | 7/2014 |
| KR | 1020190113737 A | 10/2019 |

OTHER PUBLICATIONS

Chen et al. "Title: AHG12/AHG9: Comments on miscellaneous HLS text" (Joint Video Experts Team (JVET) of ITU-T SG 16 WP 3 and ISO/IEC JTC 1/SC 29/WG 11, 17th Meeting: Brussels, BE, Jan. 7-17, 2020 Document: JVET-Q0289-vl, 7 Pages. (Source MediaTek Inc. (Year: 2020).*

(Continued)

*Primary Examiner* — David N Werner
(74) *Attorney, Agent, or Firm* — Bryan Cave Leighton Paisner LLP

(57) ABSTRACT

An image coding/decoding method and device are provided. The image decoding method carried out by the image decoding device, according to the present disclosure, may comprise the steps of: determining the number of tiles in a current picture on the basis that the segmentation of the current picture is not restricted; on the basis that the number of tiles in the current picture is a plurality, acquiring from a bitstream, a first flag representing whether tile boundary (Continued)

filtering is available; and, on the basis of the value of the first flag, determining whether to carry out filtering for the boundaries of the tiles belonging to the current picture.

10 Claims, 25 Drawing Sheets

(51) Int. Cl.
    *H04N 19/119*     (2014.01)
    *H04N 19/172*     (2014.01)
    *H04N 19/46*     (2014.01)
    *H04N 19/70*     (2014.01)
    *H04N 19/80*     (2014.01)
    *H04N 19/85*     (2014.01)
    *H04N 19/86*     (2014.01)

(52) U.S. Cl.
    CPC ........... *H04N 19/172* (2014.11); *H04N 19/46* (2014.11); *H04N 19/70* (2014.11); *H04N 19/80* (2014.11); *H04N 19/85* (2014.11); *H04N 19/86* (2014.11); *H04N 19/865* (2014.11)

(56) References Cited

OTHER PUBLICATIONS

Seethal Paluri, Hendry, & Seung Hwan Kim, "[AHG12]: Misc improvements to tile and rectangular slice signalling", JVET Document No. Q0244 (Dec. 31, 2019) (Year: 2019).*
International Search Report from PCT/KR2021/001856, dated May 21, 2021.
Kiyofumi Abe, et al., "AHG12: Loop filter control flag for tile", Joint Video Experts Team (JVET) of ITU-T SG 16 WP 3 and ISO/IEC JTC 1/SC 29/WG 11, 16th Meeting: Geneva, CH, Oct. 1-11, 2019. JVET-P0252-v1.
Benjamin Bross, et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7-17, 2020. JVET-Q2001-vC.

* cited by examiner

FIG. 4
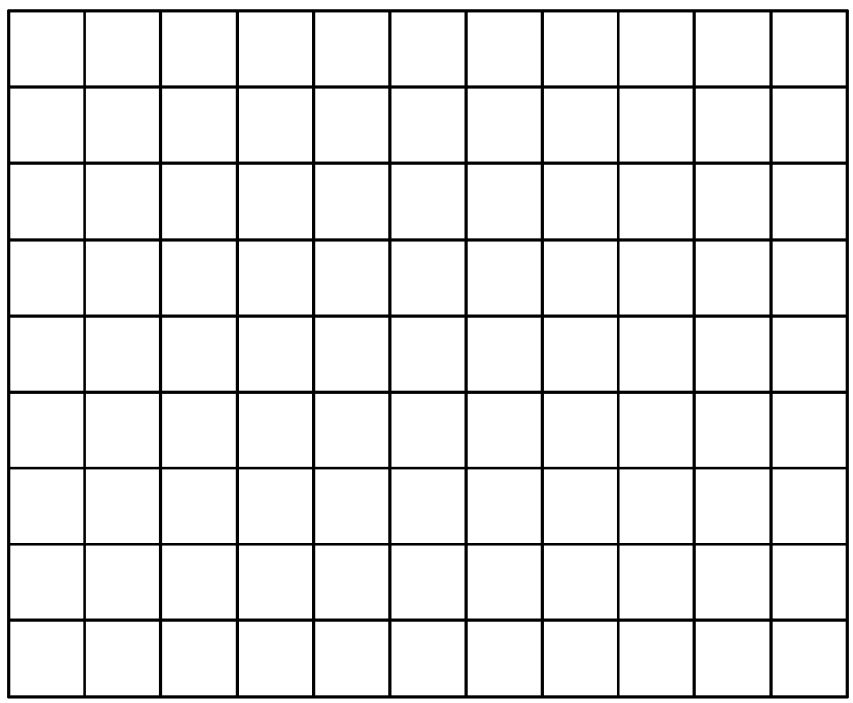
FIG. 5
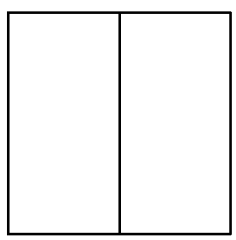 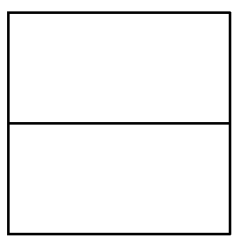 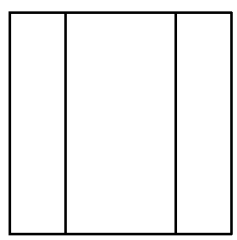 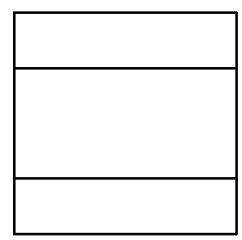
SPLIT_BT_VER  SPLIT_BT_HOR  SPLIT_TT_VER  SPLIT_TT_HOR

FIG. 25

| pic_parameter_set_rbsp( ) { | Descriptor |
|---|---|
| ....... | |
| no_pic_partition_flag | u(1) |
| if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|         tile_column_width_minus1[ i ] | ue(v) |
|     for( i = 0; i <= num_exp_tile_rows_minus1; i++ ) | |
|         tile_row_height_minus1[ i ] | ue(v) |
|     if( NumTilesInPic > 1 ) | |
|         rect_slice_flag | u(1) |
|     if( rect_slice_flag ) | |
|         single_slice_per_subpic_flag | u(1) |
|     if( rect_slice_flag && !single_slice_per_subpic_flag ) { | |
|         num_slices_in_pic_minus1 | ue(v) |
|         if( num_slices_in_pic_minus1 > 0 ) | |
|             tile_idx_delta_present_flag | u(1) |
|         for( i = 0; i < num_slices_in_pic_minus1; i++ ) { | |
|             if( NumTileColumns > 1 ) | |
|                 slice_width_in_tiles_minus1[ i ] | ue(v) |
|             if( NumTileRows > 1 &&<br>                ( tile_idx_delta_present_flag \|\| tileIdx % NumTileColumns == 0 ) ) | |
|                 slice_height_in_tiles_minus1[ i ] | ue(v) |
|             if( slice_width_in_tiles_minus1[ i ] == 0 &&<br>                slice_height_in_tiles_minus1[ i ] == 0 &&<br>                RowHeight[ SliceTopLeftTileIdx[ i ] / NumTileColumns ] > 1 ) { | |
|                 num_exp_slices_in_tile[ i ] | ue(v) |
|                 numExpSlicesInTile = num_exp_slices_in_tile[ i ] | |
|                 for( j = 0; j < numExpSlicesInTile; j++ ) | |
|                     exp_slice_height_in_ctus_minus1[ j ] | ue(v) |
|                 i += NumSlicesInTile[ i ] | |
|             } | |
|             if( tile_idx_delta_present_flag && i < num_slices_in_pic_minus1 ) | |
|                 tile_idx_delta[ i ] | se(v) |
|         } | |
|     } | |
|     loop_filter_across_tiles_enabled_flag | u(1) |
|     loop_filter_across_slices_enabled_flag | u(1) |
|     ....... | |
| } | |

2510 → no_pic_partition_flag
2520 → if( !no_pic_partition_flag ) {
2530 → loop_filter_across_tiles_enabled_flag
2540 → loop_filter_across_slices_enabled_flag

FIG. 26

| pic_parameter_set_rbsp( ) { | Descriptor |
|---|---|
| ...... | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     if( NumTilesInPic > 1 ) | |
|       rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       if( num_slices_in_pic_minus1 > 0 ) | |
|         tile_idx_delta_present_flag | u(1) |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && <br>           ( tile_idx_delta_present_flag \|\| tileIdx % NumTileColumns == 0 ) ) | |
|           slice_height_in_tiles_minus1[ i ] | ue(v) |
|         if( slice_width_in_tiles_minus1[ i ] == 0 && <br>           slice_height_in_tiles_minus1[ i ] == 0 && <br>           RowHeight[ SliceTopLeftTileIdx[ i ] / NumTileColumns ] > 1 ) { | |
|           num_exp_slices_in_tile[ i ] | ue(v) |
|           numExpSlicesInTile = num_exp_slices_in_tile[ i ] | |
|           for( j = 0; j < numExpSlicesInTile; j++ ) | |
|             exp_slice_height_in_ctus_minus1[ j ] | ue(v) |
|           i += NumSlicesInTile[ i ] | |
|         } | |
|         if( tile_idx_delta_present_flag && i < num_slices_in_pic_minus1 ) | |
|           tile_idx_delta[ i ] | se(v) |
|       } | |
|     } | |
|     if (NumTilesInPic > 1) | |
|       loop_filter_across_tiles_enabled_flag | u(1) |
|       loop_filter_across_slices_enabled_flag | u(1) |
|   } | |
| ...... | |
| } | |

2610 → if (NumTilesInPic > 1)
2620 → loop_filter_across_tiles_enabled_flag
2630 → loop_filter_across_slices_enabled_flag

FIG. 27

| pic_parameter_set_rbsp( ) { | Descriptor |
|---|---|
| ...... | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     if( NumTilesInPic > 1 ) | |
|       rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       if( num_slices_in_pic_minus1 > 0 ) | |
|         tile_idx_delta_present_flag | u(1) |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && | |
|           ( tile_idx_delta_present_flag || tileIdx % NumTileColumns == 0 ) ) | |
|           slice_height_in_tiles_minus1[ i ] | ue(v) |
|         if( slice_width_in_tiles_minus1[ i ] == 0 && | |
|           slice_height_in_tiles_minus1[ i ] == 0 && | |
|           RowHeight[ SliceTopLeftTileIdx[ i ] / NumTileColumns ] > 1 ) { | |
|           num_exp_slices_in_tile[ i ] | ue(v) |
|           numExpSlicesInTile = num_exp_slices_in_tile[ i ] | |
|           for( j = 0; j < numExpSlicesInTile; j++ ) | |
|             exp_slice_height_in_ctus_minus1[ j ] | ue(v) |
|           i += NumSlicesInTile[ i ] | |
|         } | |
|         if( tile_idx_delta_present_flag && i < num_slices_in_pic_minus1 ) | |
|           tile_idx_delta[ i ] | se(v) |
|       } | |
|     } | |
|     loop_filter_across_tiles_enabled_flag | u(1) |
|     if(num_slices_in_pic_minus1 > 0) | |
|       loop_filter_across_slices_enabled_flag | u(1) |
|   } | |
| ...... | |
| } | |

2710 — if(num_slices_in_pic_minus1 > 0)
2720 — loop_filter_across_slices_enabled_flag

FIG. 28

| pic_parameter_set_rbsp( ) { | Descriptor |
|---|---|
|   pps_no_pic_partition_flag | u(1) |
|   if( !pps_no_pic_partition_flag ) { | |
|     pps_log2_ctu_size_minus5 | u(2) |
|     pps_num_exp_tile_columns_minus1 | ue(v) |
|     pps_num_exp_tile_rows_minus1 | ue(v) |
|     for( i = 0; i <= pps_num_exp_tile_columns_minus1; i++ ) | |
|       pps_tile_column_width_minus1[ i ] | ue(v) |
|     for( i = 0; i <= pps_num_exp_tile_rows_minus1; i++ ) | |
|       pps_tile_row_height_minus1[ i ] | ue(v) |
|     if( NumTilesInPic > 1 ) { | |
|       pps_loop_filter_across_tiles_enabled_flag | u(1) |
|       pps_rect_slice_flag | u(1) |
|     } | |
|     if( pps_rect_slice_flag ) | |
|       pps_single_slice_per_subpic_flag | u(1) |
|     if( pps_rect_slice_flag && !pps_single_slice_per_subpic_flag ) { | |
|       pps_num_slices_in_pic_minus1 | ue(v) |
|       if( pps_num_slices_in_pic_minus1 > 1 ) | |
|         pps_tile_idx_delta_present_flag | u(1) |
|       for( i = 0; i < pps_num_slices_in_pic_minus1; i++ ) { | |
|         if( SliceTopLeftTileIdx[ i ] % NumTileColumns != NumTileColumns − 1 ) | |
|           pps_slice_width_in_tiles_minus1[ i ] | uc(v) |
|         if( SliceTopLeftTileIdx[ i ] / NumTileColumns != NumTileRows − 1 &&<br>          ( pps_tile_idx_delta_present_flag ||<br>          SliceTopLeftTileIdx[ i ] % NumTileColumns == 0 ) ) | |
|           pps_slice_height_in_tiles_minus1[ i ] | ue(v) |
|         if( pps_slice_width_in_tiles_minus1[ i ] == 0 &&<br>          pps_slice_height_in_tiles_minus1[ i ] == 0 &&<br>          RowHeightVal[ SliceTopLeftTileIdx[ i ] / NumTileColumns ] > 1 ) { | |
|           pps_num_exp_slices_in_tile[ i ] | uc(v) |
|           for( j = 0; j < pps_num_exp_slices_in_tile[ i ]; j++ ) | |
|             pps_exp_slice_height_in_ctus_minus1[ i ][ j ] | ue(v) |
|           i += NumSlicesInTile[ i ] − 1 | |
|         } | |
|         if( pps_tile_idx_delta_present_flag && i < pps_num_slices_in_pic_minus1 ) | |
|           pps_tile_idx_delta_val[ i ] | se(v) |
|       } | |
|     } | |
|     if( !pps_rect_slice_flag \| pps_single_slice_per_subpic_flag ||<br>      pps_num_slices_in_pic_minus1 > 0 ) | |
|       pps_loop_filter_across_slices_enabled_flag | u(1) |
|   } | |

2810 → (if line)
2820 → pps_loop_filter_across_slices_enabled_flag

IMAGE CODING/DECODING METHOD AND DEVICE FOR SELECTIVELY SIGNALING FILTER AVAILABILITY INFORMATION, AND METHOD FOR TRANSMITTING BITSTREAM

This application is the National Stage of International Application No. PCT/KR2021/001856, filed Feb. 15, 2021, which claims the benefit of U.S. Provisional Application No. 62/977,060, filed Feb. 14, 2020, the contents of which are all hereby incorporated by reference herein in their entirety.

TECHNICAL FIELD

The present disclosure relates to an image encoding/decoding method and apparatus, and, more particularly, to an image encoding/decoding method and apparatus for selectively signaling filter availability information and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus capable of improving encoding/decoding efficiency by selectively signaling filter availability information.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may comprise determining the number of tiles in a current picture based on partitioning of the current picture being not limited, obtaining, from a bitstream, a first flag indicating whether filtering on a boundary of a tile is available based on the number of tiles in the current picture being plural, and determining whether to perform filtering on the boundary of the tile belonging to the current picture based on a value of the first flag An image decoding apparatus according to an aspect of the present disclosure may comprise a memory and at least one processor. The at least one processor may determine the number of tiles in a current picture based on partitioning of the current picture being not limited, obtain, from a bitstream, a first flag indicating whether filtering on a boundary of a tile is available based on the number of tiles in the current picture being plural, and determine whether to perform filtering on the boundary of the tile belonging to the current picture based on a value of the first flag.

An image encoding method performed by an image encoding apparatus according to an aspect of the present disclosure may comprise determining the number of tiles in a current picture based on partitioning of the current picture being not limited, determining a value of a first flag indicating whether filtering on a boundary of a tile is available based on the number of tiles in the current picture being plural, and generating a bitstream including the first flag.

Also, a transmission method according to an aspect of the present disclosure may transmit a bitstream generated by an image encoding apparatus or method of the present disclosure.

In addition, a computer-readable recording medium according to an aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus capable of improving encoding/decoding efficiency by selectively signaling filter availability information.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 4 is a view showing a partitioning structure of an image according to an embodiment.

FIG. 5 is a view showing an embodiment of a partitioning type of a block according to a multi-type tree structure.

FIGS. 25 to 28 are views showing an individual embodiment of syntax for a picture parameter set.

MODE FOR INVENTION

Figure 1:
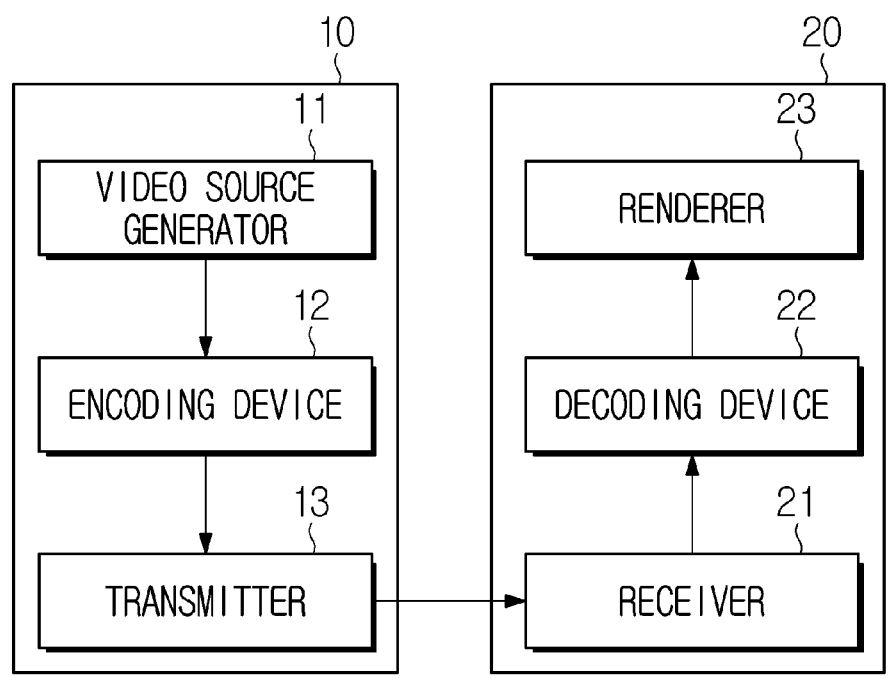
FIG. 1 is a view schematically showing a video coding system to which the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, "video" may mean a set of a series of images over time. A "picture" generally refers to a unit representing one image in a specific time period, and a slice/tile is a coding unit constituting a part of a picture in encoding. One picture may consist of one or more slices/tiles. Also, a slice/tile may include one or more coding tree units (CTUs). The CTU may be split into one or more CUs. One picture may consist of one or more slices/tiles. A tile is a rectangular area present in a specific tile row and a specific tile column in a picture, and may consist of a plurality of CTUs. A tile column may be defined as a rectangular area of CTUs, may have the same height as the picture, and may have a width specified by a syntax element signaled from a bitstream part such as a picture parameter set. A tile row may be defined as a rectangular area of CTUs, may have the same width as a picture, and may have a height specified by a syntax element signaled from a bitstream part such as a picture parameter set. A tile scan is a certain continuous ordering method of CTUs partitioning a picture. Here, CTUs may be sequentially ordered according to a CTU raster scan within a tile, and tiles in a picture may be sequentially ordered according to a raster scan order of tiles of the picture. A slice may contain an integer number of complete tiles, or may contain a integer number of continuous complete CTU rows within one tile of one picture. A slice may be exclusively included in a single NAL unit.

One picture may consist of one or more tile groups. One tile group may include one or more tiles. A brick may indicate a rectangular area of CTU rows within a tile in a picture. One tile may include one or more bricks. A brick may represent a rectangular area of CTU rows in a tile. One tile may be partitioned into a plurality of bricks, and each brick may include one or more CTU rows belonging to the tile. A tile that is not partitioned into a plurality of bricks may also be treated as a brick.

Meanwhile, one picture may be partitioned into two or more subpictures. A subpicture may be a rectangular area of one or more slices in a picture.

A "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. One unit may include one luma block and two chroma (e.g., Cb and Cr) blocks. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a source device 10 and a reception device 20. The source device 10 may deliver encoded video and/or image information or data to the reception device 20 in the form of a file or streaming via a digital storage medium or network.

The source device 10 according to an embodiment may include a video source generator 11, an encoding apparatus 12 and a transmitter 13. The reception device 20 according to an embodiment may include a receiver 21, a decoding device 22 and a renderer 23. The encoding device 12 may be called a video/image encoding apparatus, and the decoding device 22 may be called a video/image decoding apparatus. The transmitter 13 may be included in the encoding device 12. The receiver 21 may be included in the decoding device 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding device 12 may encode an input video/image. The encoding device 12 may perform a series of procedures such as prediction, transform, and quantization for compression and coding efficiency. The encoding device 12 may output encoded data (encoded video/image information) in the form of a bitstream.

The transmitter 13 may transmit the encoded video/image information or data output in the form of a bitstream to the receiver 21 of the reception device 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding device 22.

The decoding device 22 may decode the video/image by performing a series of procedures such as dequantization, inverse transform, and prediction corresponding to the operation of the encoding device 12.

The renderer 23 may render the decoded video/image. The rendered video/image may be displayed through the display.

Overview of Image Encoding Apparatus

Figure 2:
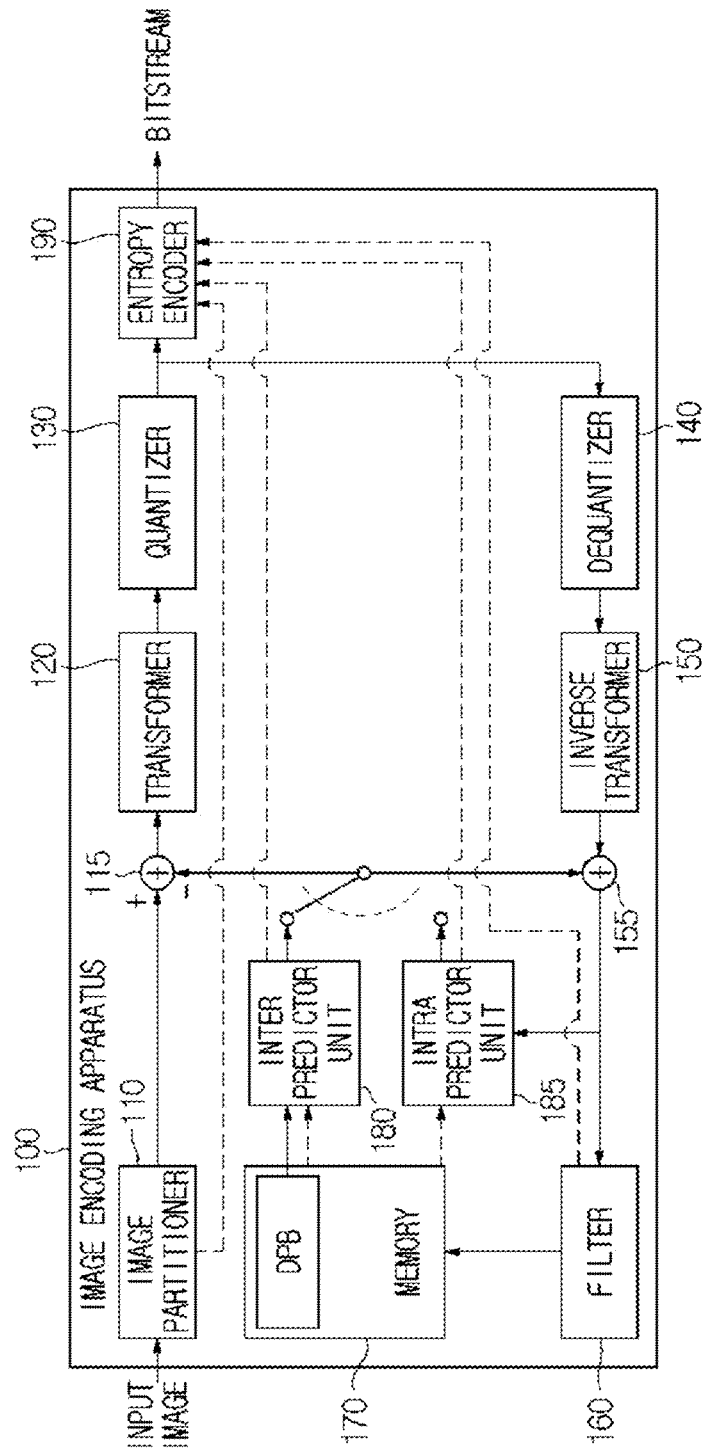
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
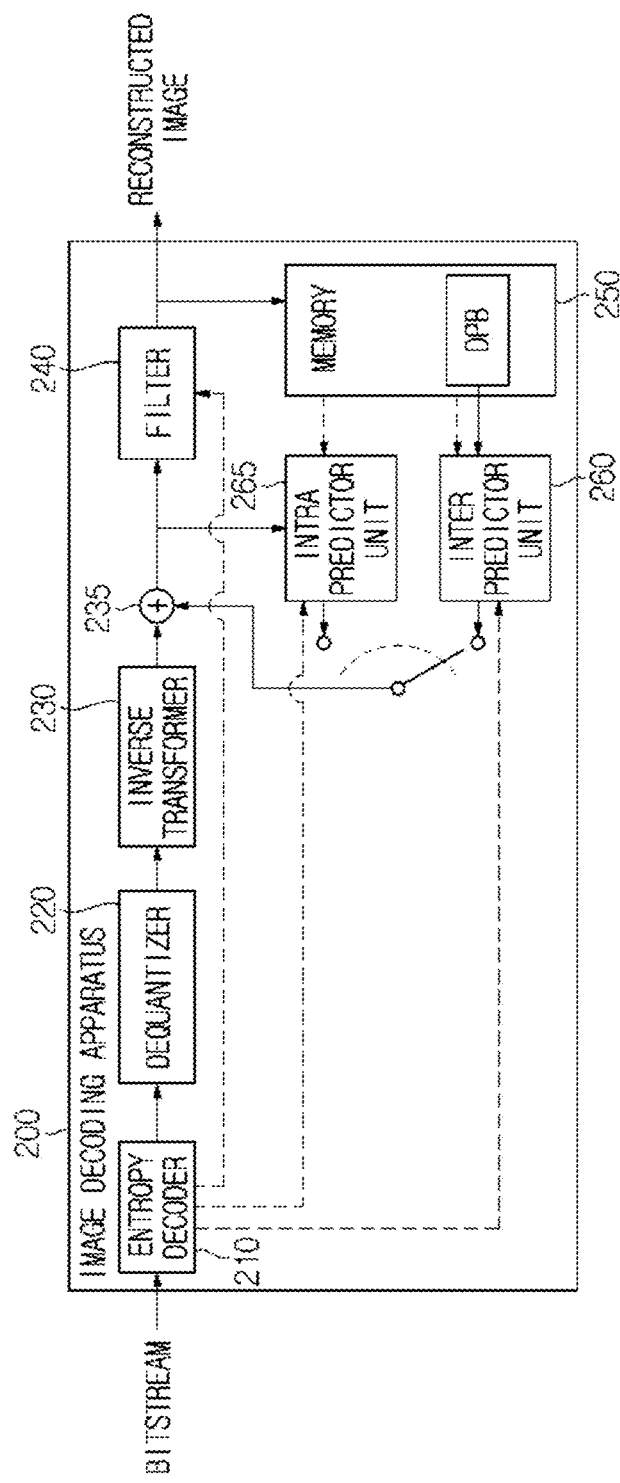
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 160 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Image Partitioning

The video/image coding method according to the present disclosure may be performed based on an image partitioning structure as follows. Specifically, the procedures of prediction, residual processing ((inverse) transform, (de)quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the decoding apparatus in the form of a bitstream. The entropy decoder 210 of the decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding.

Pictures may be partitioned into a sequence of coding tree units (CTUs). FIG. 4 shows an example in which a picture is partitioned into CTUs. The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples. A maximum allowable size of a CTU for coding and prediction may be different from a maximum allowable size of a CTU for transform. For example, a maximum allowable size of a luma block in the CTU may be 128×128, even if the maximum size of luma transform blocks is 64×64.

Overview of Partitioning of CTU

As described above, the coding unit may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structures, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

FIG. 5 is a view showing an embodiment of a partitioning type of a block according to a multi-type tree structure. Partitioning according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 4, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 4, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 5, by horizontal ternary splitting, two CUs having a height which is ¼ of the height of the current CU and having the same width as the current CU and a CU having a height which is half the height of the current CU and having the same width as the current CU may be generated.

Figure 6:
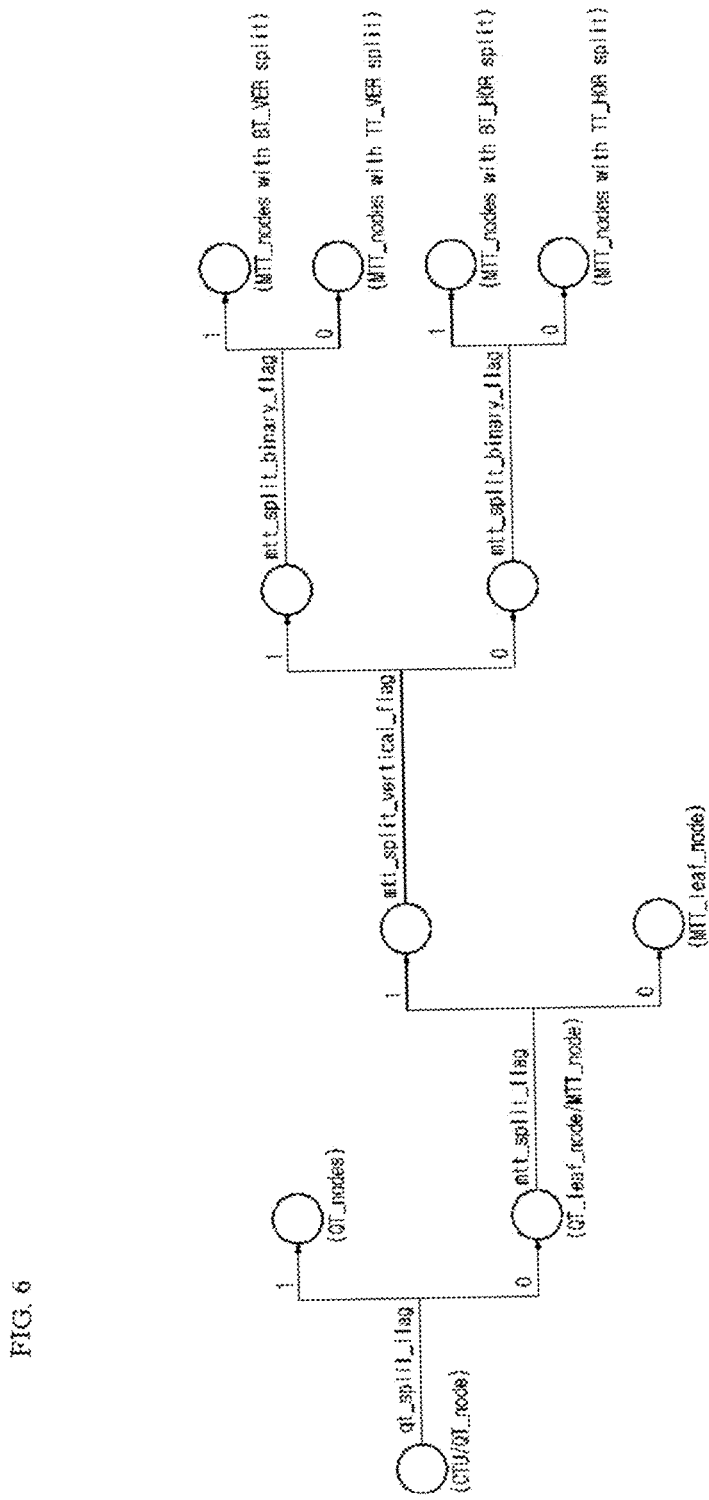
FIG. 6 is a view showing a signaling mechanism of block splitting information in a quadtree with nested multi-type tree structure according to the present disclosure.

FIG. 6 is a view showing a signaling mechanism of block splitting information in a quadtree with nested multi-type tree structure according to the present disclosure.

Here, the CTU is treated as the root node of the quadtree, and is partitioned for the first time into a quadtree structure. Information (e.g., qt_split_flag) indicating whether quadtree splitting is performed with respect to the current CU (CTU or node (QT_node) of the quadtree) may be signaled. For example, when qt_split_flag has a first value (e.g., "1"), the current CU may be quadtree-partitioned. In addition, when qt_split_flag has a second value (e.g., "0"), the current CU is not quadtree-partitioned, but becomes the leaf node (QT_leaf_node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu_flag) may be signaled to indicate whether the current node is additionally partitioned. If the corresponding node is additionally partitioned (e.g., if the first flag is 1), a second flag (e.g., Mtt_split_cu_vertical_flag) may be signaled to indicate the splitting direction. For example, the splitting direction may be a vertical direction if the second flag is 1 and may be a horizontal direction if the second flag is 0. Then, a third flag (e.g., Mtt_split_cu_binary_flag) may be signaled to indicate whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below. In the following description, the multi-type tree splitting mode may be referred to as a multi-tree splitting type or splitting type.

of TUs in a CU region. The TU size generally may represent a luma component (sample) transform block (TB) size.

The TU size may be derived based a largest allowable TB size maxTbSize which is a predetermined value. For example, when the CU size is greater than maxTbSize, a plurality of TUs (TBs) having maxTbSize may be derived from the CU and transform/inverse transform may be performed in units of TU (TB). For example, the largest allowable luma TB size may be 64×64 and the largest allowable chroma TB size may be 32×32. If the width or height of the CB partitioned according to the tree structure is larger than the largest transform width or height, the CB may be automatically (or implicitly) partitioned until the TB size limit in the horizontal and vertical directions is satisfied.

In addition, for example, when intra prediction is applied, an intra prediction mode/type may be derived in units of CU (or CB) and a neighboring reference sample derivation and prediction sample generation procedure may be performed in units of TU (or TB). In this case, there may be one or a plurality of TUs (or TBs) in one CU (or CB) region and, in this case, the plurality of TUs or (TBs) may share the same intra prediction mode/type.

Meanwhile, for a quadtree coding tree scheme with nested multitype tree, the following parameters may be signaled as SPS syntax elements from the encoding apparatus to the decoding apparatus. For example, at least one of a CTU size

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 7:
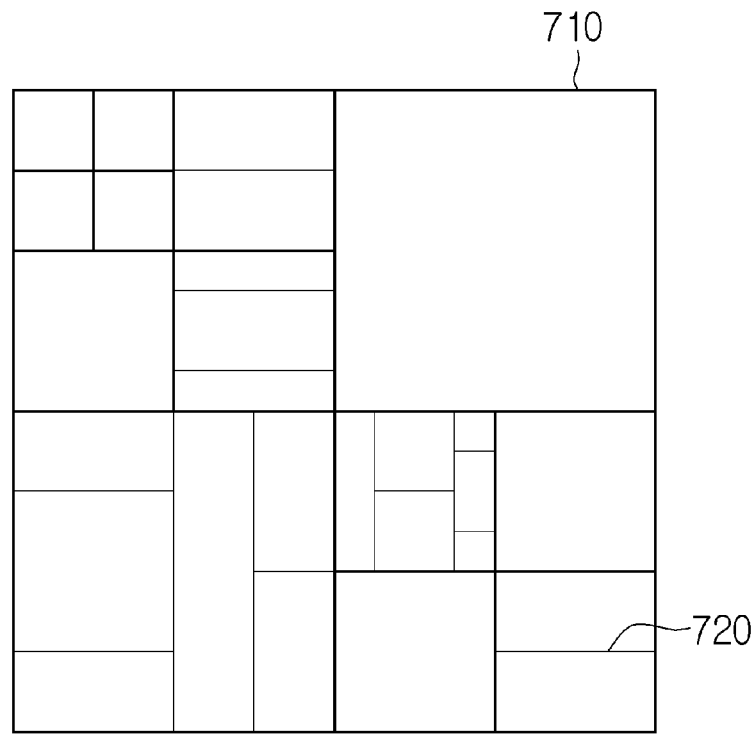
FIG. 7 is a view showing an embodiment in which a CTU is split into multiple CUs.

FIG. 7 is a view showing an example in which a CTU is partitioned into multiple CUs by applying a multi-type tree after applying a quadtree. In FIG. 7, bold block edges 710 represent quadtree partitioning and the remaining edges 720 represent multitype tree partitioning. The CU may correspond to a coding block (CB). In an embodiment, the CU may include a coding block of luma samples and two coding blocks of chroma samples corresponding to the luma samples. A chroma component (sample) CB or TB size may be derived based on a luma component (sample) CB or TB size according to the component ratio according to the color format (chroma format, e.g., 4:4:4, 4:2:2, 4:2:0 or the like) of the picture/image. In case of 4:4:4 color format, the chroma component CB/TB size may be set equal to be luma component CB/TB size. In case of 4:2:2 color format, the width of the chroma component CB/TB may be set to half the width of the luma component CB/TB and the height of the chroma component CB/TB may be set to the height of the luma component CB/TB. In case of 4:2:0 color format, the width of the chroma component CB/TB may be set to half the width of the luma component CB/TB and the height of the chroma component CB/TB may be set to half the height of the luma component CB/TB.

In an embodiment, when the size of the CTU is 128 based on the luma sample unit, the size of the CU may have a size from 128×128 to 4×4 which is the same size as the CTU. In one embodiment, in case of 4:2:0 color format (or chroma format), a chroma CB size may have a size from 64×64 to 2×2.

Meanwhile, in an embodiment, the CU size and the TU size may be the same. Alternatively, there may be a plurality which is a parameter representing the root node size of a quadtree, MinQTSize which is a parameter representing the minimum allowed quadtree leaf node size, MaxBtSize which is a parameter representing the maximum allowed binary tree root node size, MaxTtSize which is a parameter representing the maximum allowed ternary tree root node size, MaxMttDepth which is a parameter representing the maximum allowed hierarchy depth of multi-type tree splitting from a quadtree leaf node, MinBtSize which is a parameter representing the minimum allowed binary tree leaf node size, or MinTtSize which is a parameter representing the minimum allowed ternary tree leaf node size may be signaled.

As an embodiment of using 4:2:0 chroma format, the CTU size may be set to 128×128 luma blocks and two 64×64 chroma blocks corresponding to the luma blocks. In this case, MinOTSize may be set to 16×16, MaxBtSize may be set to 128×128, MaxTtSzie may be set to 64×64, MinBtSize and MinTtSize may be set to 4×4, and MaxMttDepth may be set to 4. Quadtree partitioning may be applied to the CTU to generate quadtree leaf nodes. The quadtree leaf node may be called a leaf QT node. Quadtree leaf nodes may have a size from a 16×16 size (e.g., the MinOTSize) to a 128×128 size (e.g., the CTU size). If the leaf QT node is 128×128, it may not be additionally partitioned into a binary tree/ternary tree. This is because, in this case, even if partitioned, it exceeds MaxBtsize and MaxTtszie (e.g., 64×64). In other cases, leaf QT nodes may be further partitioned into a multitype tree. Therefore, the leaf QT node is the root node for the multi-type tree, and the leaf QT node may have a multitype tree depth (mttDepth) 0 value. If the multitype tree depth reaches MaxMttdepth (e.g., 4), further partitioning may not be considered further. If the width of the multitype tree node is equal to MinBtSize and less than or equal to 2×MinTtSize, then no further horizontal partitioning may be considered. If the height of the multitype tree node is equal to MinBtSize and less than or equal to 2×MinTtSize, no further vertical partitioning may be considered. When partitioning is not considered, the encoding apparatus may skip signaling of partitioning information. In this case, the decoding apparatus may derive partitioning information with a predetermined value.

Meanwhile, one CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure may be represented as SINGLE_TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may include a coding block of luma components or coding blocks of two chroma components and a CU of a P or B slice/tile group may include blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT_split_type) including information on how many blocks the leaf node of the QT structure is partitioned into and a syntax element (ex. MPT_split_mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the Tr structure, the CU of the lower depth may be partitioned into ⅕, ⅓, ⅜, ⅗, ⅔, or ⅝ of the CU of the higher depth in some cases, and the method of partitioning the CU is not limited thereto.

The quadtree coding block structure with the multi-type tree may provide a very flexible block partitioning structure. Because of the partition types supported in a multi-type tree, different partition patterns may potentially result in the same coding block structure in some cases. In the encoding apparatus and the decoding apparatus, by limiting the occurrence of such redundant partition patterns, a data amount of partitioning information may be reduced.

In addition, in video/image encoding and decoding according to the present disclosure, an image processing unit may have a hierarchical structure. One picture may be divided into one or more tiles, bricks, slices, and/or tile groups. One slice may include one or more bricks. One brick may include one or more CTU rows in a tile. A slice may include an integer number of bricks of a picture. One tile group may include one or more tiles. One tile may include one or more CTUs. The CTU may be split into one or more CUs. A tile may be a rectangular area composed of a specific tile row and a specific tile column composed of a plurality of CTUs in a picture. The tile group may include an integer number of tiles according to the tile raster scan in the picture. The slice header may carry information/parameters applicable to the slice (blocks in the slice). When the encoding apparatus or the decoding apparatus has a multi-core processor, encoding/decoding procedures for the tile, slice, brick, and/or tile group may be performed in parallel.

In the present disclosure, the names or concepts of a slice or a tile group may be mixed. That is, the tile group header may be referred to as a slice header. Here, the slice may have one of slice types including intra (I) slice, predictive (P) slice, and bi-predictive (B) slice. For blocks in the I slice, inter prediction is not used for prediction, and only intra prediction may be used. Of course, even in this case, an original sample value may be coded and signaled without prediction. For blocks in a P slice, intra prediction or inter prediction may be used, and, when inter prediction is used, only uni-prediction may be used. Meanwhile, intra prediction or inter prediction may be used for blocks in a B slice, and, when inter prediction is used, up to the maximum bi-prediction may be used.

The encoding apparatus may determine tile/tile group, brick, slice, and maximum and minimum coding unit sizes according to characteristics (e.g., resolution) of a video image or in consideration of coding efficiency or parallel processing. In addition, information on this or information for deriving this may be included in a bitstream.

The decoding apparatus may obtain information indicating whether a tile/tile group, a brick and a slice of a current picture and a CTU in a tile are split into a plurality of coding units. The encoding apparatus and the decoding apparatus may increase encoding efficiency by signaling such information only under specific conditions.

The slice header (slice header syntax) may include information/parameters commonly applicable to the slice. APS (APS syntax) or PPS (PPS syntax) may include information/parameters commonly applicable to one or more pictures. SPS (SPS syntax) may include information/parameters commonly applicable to one or more sequences. VPS (VPS syntax) may include information/parameters commonly applicable to multiple layers. DPS (DPS syntax) may include information/parameters commonly applicable to the entire video. DPS may include information/parameters related to a combination of a coded video sequence (CVS).

In addition, for example, information on split and configuration of the tile/tile group/brick/slice may be configured at the encoding end through the higher-level syntax and transmitted to the decoding apparatus in the form of a bitstream.

Overview of Intra Prediction

Hereinafter, intra prediction performed by the above-described encoding device and decoding apparatus will be described in greater detail. Intra prediction may represent prediction for generating prediction samples for a current block based on reference samples in a picture to which a current block belongs (hereinafter referred to as a current picture).

Figure 8:
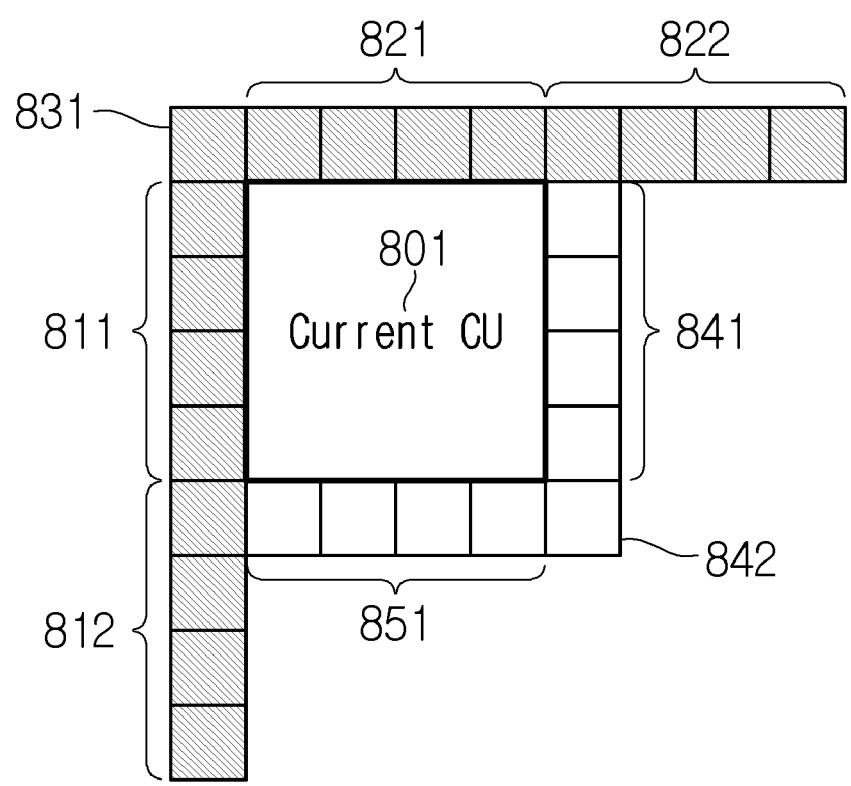
FIG. 8 is a view showing a neighboring reference sample according to an embodiment.
Figure 9:
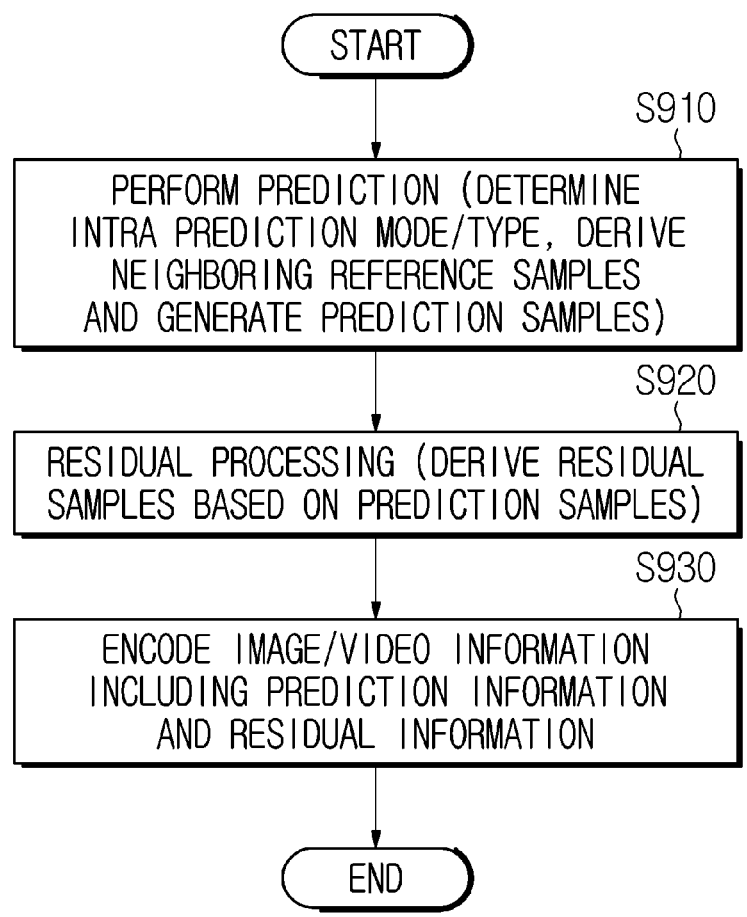
FIGS. 9 to 10 are views illustrating intra prediction according to an embodiment.
Figure 10:
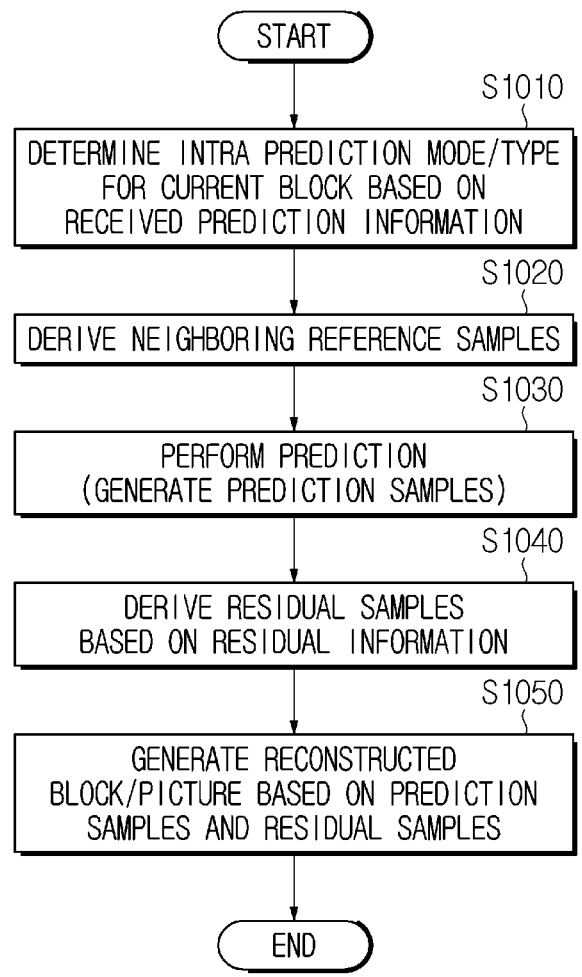

A description will be given with reference to FIG. 8. When intra prediction is applied to a current block 801, neighboring reference samples to be used for intra prediction of the current block 801 may be derived. The neighboring reference samples of the current block may include a total of 2×nh samples including samples 811 adjacent to a left boundary of the current block having a size of nW×nH and samples 812 adjacent to a bottom-left, a total of 2×nW samples including samples 821 adjacent to a top boundary of the current block and samples 822 adjacent to a top-right, and one sample 831 adjacent to a top-left of the current block. Alternatively, the neighboring reference samples of the current block may include a plurality of columns of top neighboring samples and a plurality of rows of left neighboring samples.

In addition, the neighboring reference samples of the current block may include a total of nH samples 841 adjacent to a right boundary of the current block having a size of nW×nH, a total of nW samples 851 adjacent to a bottom boundary of the current block and one sample 842 adjacent to a bottom-right of the current block.

However, some of the neighboring reference samples of the current block have not yet been decoded or may not be available. In this case, the decoding apparatus may construct neighboring reference samples to be used for prediction by substituting unavailable samples with available samples. Alternatively, neighboring reference samples to be used for prediction may be constructed through interpolation of available samples.

When the neighboring reference samples are derived, (i) a prediction sample may be derived based on an average or interpolation of neighboring reference samples of the current block, and (ii) the prediction sample may be derived based on a reference sample present in a specific (prediction) direction with respect to the prediction sample among the neighboring reference samples of the current block. The case of (i) may be called a non-directional mode or a non-angular mode, and the case of (ii) may be called a directional mode or an angular mode. Also, the prediction sample may be generated through interpolation of the first neighboring sample and the second neighboring sample positioned in the opposite direction to the prediction direction of the intra prediction mode of the current block based on the prediction sample of the current block among the neighboring reference samples. The above-described case may be referred to as linear interpolation intra prediction (LIP). In addition, chroma prediction samples may be generated based on luma samples using a linear model. This case may be called an LM mode. In addition, a temporary prediction sample of the current block may be derived based on the filtered neighboring reference samples, and the prediction sample of the current block may be derived by a weighted sum of at least one reference sample derived according to the intra prediction mode among the existing neighboring reference samples, that is, unfiltered neighboring reference samples, and the temporary prediction sample. The above-described case may be referred to as position dependent intra prediction (PDPC). In addition, a reference sample line with the highest prediction accuracy is selected from among multiple neighboring reference sample lines of the current block, to derive the prediction sample using the reference sample located in the prediction direction in the corresponding line, and, at this time, intra prediction coding may be performed in a manner of instructing (signaling) the used reference sample line to the decoding apparatus. The above-described case may be referred to as multi-reference line (MRL) intra prediction or MRL-based intra prediction. In addition, the current block is partitioned into vertical or horizontal sub-partitions to perform intra prediction based on the same intra prediction mode, but neighboring reference samples may be derived and used in units of sub-partitions. That is, in this case, the intra prediction mode for the current block is equally applied to the sub-partitions, but the intra prediction performance may be improved in some cases by deriving and using neighboring reference samples in units of sub-partitions. This prediction method may be called intra sub-partitions (ISP) or ISP-based intra prediction. These intra prediction methods may be called an intra prediction type to be distinguished from an intra prediction mode (e.g. DC mode, planar mode, and directional mode). The intra prediction type may be referred to as various terms such as an intra prediction technique or an additional intra prediction mode. For example, the intra prediction type (or additional intra prediction mode, etc.) may include at least one of the aforementioned LIP, PDPC, MRL or ISP. A general intra prediction method excluding a specific intra prediction type such as LIP, PDPC, MRL, and ISP may be referred to as a normal intra prediction type. The normal intra prediction type may refer to a case in which the above specific intra prediction type is not applied, and prediction may be performed based on the above-described intra prediction mode. Meanwhile, if necessary, post-processing filtering may be performed on the derived prediction sample.

Specifically, the intra prediction procedure may include an intra prediction mode/type determination step, a neighboring reference sample derivation step, and an intra prediction mode/type based prediction sample derivation step. In addition, if necessary, a post-filtering step may be performed on the derived prediction sample.

Meanwhile, affine linear weighted intra prediction (ALWIP) may be used in addition to the above-described intra prediction types. The ALWIP may be referred to as linear weighted intra prediction (LWIP) or matrix weighted intra prediction or matrix based intra prediction (MIP). When the MIP is applied to the current block, i) neighboring reference samples on which an averaging procedure has been performed may be used, ii) a matrix-vector-multiplication procedure may be performed, iii) if necessary, a horizontal/vertical interpolation procedure may be further performed, thereby deriving prediction samples for the current block. The intra prediction modes used for the MIP may be configured differently from the intra prediction modes used in the above-described LIP, PDPC, MRL, and ISP intra prediction or normal intra prediction. The intra prediction mode for the MIP may be referred to as a MIP intra prediction mode, a MIP prediction mode, or a MIP mode. For example, a matrix and an offset used in the matrix-vector-multiplication may be set differently according to the intra prediction mode for the MIP. Here, the matrix may be referred to as a (MIP) weight matrix, and the offset may be referred to as a (MIP) offset vector or a (MIP) bias vector. A specific MIP method will be described later.

A block reconstruction procedure based on intra prediction and an intra prediction unit in the encoding apparatus may schematically include the following, for example. S910 may be performed by the intra prediction unit 185 of the encoding apparatus, and S920 may be performed by the residual processor including at least one of the subtractor 115, the transformer 120, the quantizer 130, the dequantizer 140 and the inverse transformer 150 of the encoding apparatus. Specifically, S920 may be performed by the subtractor 115 of the encoding apparatus. In S930, prediction information may be derived by the intra prediction unit 185, and may be encoded by the entropy encoder 190. In S930, residual information may be derived by the residual processor, and may be encoded by the entropy encoder 190. The residual information is information on residual samples. The residual information may include information on quantized transform coefficients for the residual samples. As described above, the residual samples may be derived as transform coefficients through the transformer 120 of the encoding apparatus, and the transform coefficients may be derived as quantized transform coefficients through the quantizer 130. Information on the quantized transform coefficients may be encoded by the entropy encoder 190 through a residual coding procedure.

The encoding apparatus may perform intra prediction with respect to the current block (S910). The encoding apparatus may derive an intra prediction mode/type for the current block, derive neighboring reference samples of the current block, and generate prediction samples in the current block based on the intra prediction mode/type and the neighboring reference samples. Here, a procedure for determining an intra prediction mode/type, a procedure for deriving neighboring reference samples and a procedure for generating prediction samples may be simultaneously performed, or any one procedure may be performed before another procedure. For example, although not shown, the intra prediction unit 185 of the encoding apparatus may include an intra prediction mode/type determination unit, a reference sample derivation unit, a prediction sample derivation unit. The intra prediction mode/type determination unit may determine the intra prediction mode/type for the current block, the reference sample derivation unit may derive neighboring reference samples of the current block, and the prediction sample derivation unit may derive the prediction samples of the current block. Meanwhile, when the below-described prediction sample filtering procedure is performed, the intra prediction unit 185 may further include a prediction sample filter. The encoding apparatus may determine a mode/type applied to the current block from among a plurality of intra prediction modes/types. The encoding apparatus may compare RD costs of the intra prediction modes/types and determine an optimal intra prediction mode/type for the current block.

Meanwhile, the encoding apparatus may perform a prediction sample filtering procedure. Predictive sample filtering may be referred to as post filtering. Some or all of the prediction samples may be filtered by the prediction sample filtering procedure. In some cases, the prediction sample filtering procedure may be omitted.

The encoding apparatus may generate residual samples for the current block based on (filtered) prediction samples (S920). The encoding apparatus may compare the prediction samples from the original samples of the current block based on a phase and derive the residual samples.

The encoding apparatus may encode image information including information on intra prediction (prediction information) and residual information of the residual samples (S930). The prediction information may include the intra prediction mode information and the intra prediction type information. The encoding apparatus may output encoded image information in the form of a bitstream. The output bitstream may be transmitted to the decoding apparatus through a storage medium or a network.

The residual information may include a residual coding syntax described below. The encoding apparatus may transform/quantize the residual samples to derive quantized transform coefficients. The residual information may include information on the quantized transform coefficients.

Meanwhile, as described above, the encoding apparatus may generate a reconstructed picture (including reconstructed samples and a reconstructed block). To this end, the encoding apparatus may perform dequantization/inverse transform with respect to the quantized transform coefficients again to derive (modified) residual samples. The residual samples are transformed/quantized and then dequantized/inversely transformed, in order to derive the same residual samples as the residual samples derived in the decoding apparatus as described above. The encoding apparatus may generate a reconstructed block including the reconstructed samples for the current block based on the prediction samples and the (modified) residual samples. A reconstructed picture for the current picture may be generated based on the reconstructed block. As described above, an in-loop filtering procedure is further applicable to the reconstructed picture.

A video/image decoding procedure based on intra prediction and the intra prediction unit in the decoding apparatus may schematically include the following, for example. The decoding apparatus may perform operation corresponding to operation performed by the encoding apparatus.

S1010 to S1030 may be performed by the intra prediction unit 265 of the decoding apparatus, and the prediction information of S1010 and the residual information of S1040 may be obtained from the bitstream by the entropy decoder 210 of the decoding apparatus. The residual processor including the dequantizer 220 and the inverse transformer 230 of the decoding apparatus may derive the residual samples for the current block based on the residual information. Specifically, the dequantizer 220 of the residual processor may perform dequantization based on quantized transform coefficients derived based on the residual information to derive transform coefficients, and the dequantizer 230 of the residual processor may perform inverse transform with respect to the transform coefficients to derive the residual samples for the current block. S1050 may be performed by the adder 235 or the reconstructor of the decoding apparatus.

Specifically, the decoding apparatus may derive a intra prediction mode/type for the current block based on the received prediction information (intra prediction mode/type information) (S1010). The decoding apparatus may derive neighboring reference samples of the current block (S1020). The decoding apparatus may generate prediction samples in the current blocks based on the intra prediction mode/type and the neighboring reference samples (S1030). In this case, the decoding apparatus may perform a prediction sample filtering procedure. Predictive sample filtering may be referred to as post filtering. Some or all of the prediction samples may be filtered by the prediction sample filtering procedure. In some cases, the prediction sample filtering procedure may be omitted.

The decoding apparatus generates residual samples for the current block based on the received residual information. The decoding apparatus may generate reconstructed samples for the current block based on the prediction samples and the residual samples, and derive a reconstructed block including the reconstructed samples (S1040). A reconstructed picture for the current picture may be generated based on the reconstructed block. As described above, the in-loop filtering procedure is further applicable to the reconstructed picture.

Here, the intra prediction unit 265 of the decoding apparatus may include an intra prediction mode/type determination unit, a reference sample derivation unit and a prediction sample derivation unit, the intra prediction mode/type determination unit may determine the intra prediction mode/type for the current block based on the intra prediction mode/type information obtained by the entropy decoder 210, the reference sample derivation unit may derive the neighboring reference samples of the current block, and the prediction sample derivation unit may derive the prediction samples of the current block. Meanwhile, although not shown, when the above-described prediction sample filtering procedure is performed, the intra prediction unit 265 may further include a prediction sample filter.

The intra prediction mode information may include flag information (e.g., intra_luma_mpm_flag) specifying whether a most probable mode (MPM) or a remaining mode applies to the current block, and, when the MPM applies to the current block, the prediction mode information may further include index information (e.g., intra_luma_mpm_idx) specifying one of intra prediction mode candidates (MPM candidates). The intra prediction mode candidates (MPM candidates) may be configured as an MPM candidate list or an MPM list. In addition, when the MPM does not apply to the current block, the intra prediction mode information may further include remaining mode information (e.g., intra_luma_mpm_remainder) specifying one of the remaining intra prediction modes excluding the intra prediction mode candidates (MPM candidates). The decoding apparatus may determine the intra prediction mode of the current block based on the intra prediction mode information. For the above-described MIP, a separate MPL list may be constructed.

In addition, the intra prediction type information may be implemented in various forms. For example, the intra prediction type information may include intra prediction type index information specifying one of the intra prediction types. As another example, the intra prediction type information may include at least one of reference sample line information (e.g., intra_luma_ref_idx)) specifying whether the MRL applies to the current block and which reference sample line is used if applied, ISP flag information (e.g., intra_subpartitions_mode_flag) specifying whether the ISP applies to the current block, ISP type information (e.g., intra_subpartitions_split_flag) specifying the split type of subpartitions when the ISP applies, flag information specifying whether PDCP applies or flag information specifying whether LIP applies. In addition, the intra prediction type information may include an MIP flag specifying whether MIP applies to the current block.

The intra prediction mode information and/or the intra prediction type information may be encoded/decoded through the coding method described in the present disclosure. For example, the intra prediction mode information and/or the intra prediction type information may be encoded/decoded through entropy coding (e.g., CABAC or CAVLC) based on truncated (rice) binary code.

Overview of Inter Prediction

Hereinafter, detailed technology of the inter prediction method in the description of encoding and decoding with reference to FIGS. 2 and 3 will be described. In the case of a decoding apparatus, an inter prediction-based video/image decoding method and an inter prediction unit in the decoding apparatus may operate according to the following description. In the case of an encoding apparatus, an inter prediction-based video/image encoding method and an inter prediction unit in the encoding apparatus may operate according to the following description. In addition, data encoded according to the following description may be stored in the form of a bitstream.

The prediction unit of an encoding apparatus and a decoding apparatus may perform inter prediction in units of blocks to derive a prediction sample. Inter prediction may mean prediction derived in a manner that is dependent on data elements (e.g., sample values, motion information, etc.) of picture(s) other than a current picture. When inter prediction applies to the current block, a predicted block (prediction sample array) for the current block may be derived based on a reference block (reference sample array) specified by a motion vector on a reference picture indicated by a reference picture index. In this case, in order to reduce the amount of motion information transmitted in an inter prediction mode, motion information of the current block may be predicted in units of blocks, subblocks or samples, based on correlation of motion information between a neighboring block and the current block. The motion information may include a motion vector and a reference picture index. The motion information may further include inter prediction type (L0 prediction, L1 prediction, Bi prediction, etc.) information. When applying inter prediction, the neighboring block may include a spatial neighboring block present in the current picture and a temporal neighboring block present in the reference picture. A reference picture including the reference block and a reference picture including the temporal neighboring block may be the same or different. The temporal neighboring block may be referred to as a collocated reference block, collocated CU (ColCU), and the reference picture including the temporal neighboring block may be referred to as a collocated picture (colPic). For example, a motion information candidate list may be constructed based on the neighboring blocks of the current block, and flag or index information indicating which candidate is selected (used) may be signaled in order to derive the motion vector of the current block and/or the reference picture index. Inter prediction may be performed based on various prediction modes. For example, in the case of a skip mode and a merge mode, the motion information of the current block may be equal to the motion information of the selected neighboring block. In the case of the skip mode, a residual signal may not be transmitted unlike the merge mode. In the case of a motion information prediction (MVP) mode, the motion vector of the selected neighboring block may be used as a motion vector predictor and a motion vector difference may be signaled. In this case, the motion vector of the current block may be derived using a sum of the motion vector predictor and the motion vector difference.

The motion information may include L0 motion information and/or L1 motion information according to the inter prediction type (L0 prediction, L1 prediction, Bi prediction, etc.). The motion vector in an L0 direction may be referred to as an L0 motion vector or MVL0, and the motion vector in an L1 direction may be referred to as an L1 motion vector or MVL1. Prediction based on the L0 motion vector may be referred to as L0 prediction, prediction based on the L1 motion vector may be referred to as L1 prediction, and prediction based both the L0 motion vector and the L1 motion vector may be referred to as Bi prediction. Here, the L0 motion vector may indicate a motion vector associated with a reference picture list L0 (L0) and the L1 motion vector may indicate a motion vector associated with a reference picture list L1 (L1). The reference picture list L0 may include pictures before the current picture in output order as reference pictures, and the reference picture list L1 may include pictures after the current picture in output order. The previous pictures may be referred to as forward (reference) pictures and the subsequent pictures may be referred to as reverse (reference) pictures. The reference picture list L0 may further include pictures after the current picture in output order as reference pictures. In this case, within the reference picture list L0, the previous pictures may be first indexed and the subsequent pictures may then be indexed. The reference picture list L1 may further include pictures before the current picture in output order as reference pictures. In this case, within the reference picture list L1, the subsequent pictures may be first indexed and the previous pictures may then be indexed. Here, the output order may correspond to picture order count (POC) order.

Figure 11:
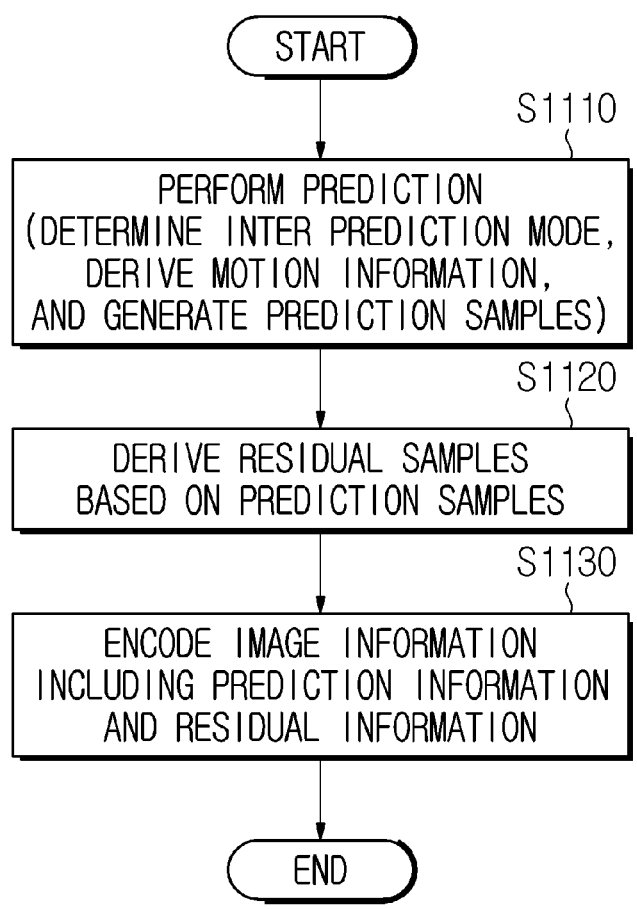
FIG. 11 is a view illustrating an encoding method using inter prediction according to an embodiment.
Figure 12:
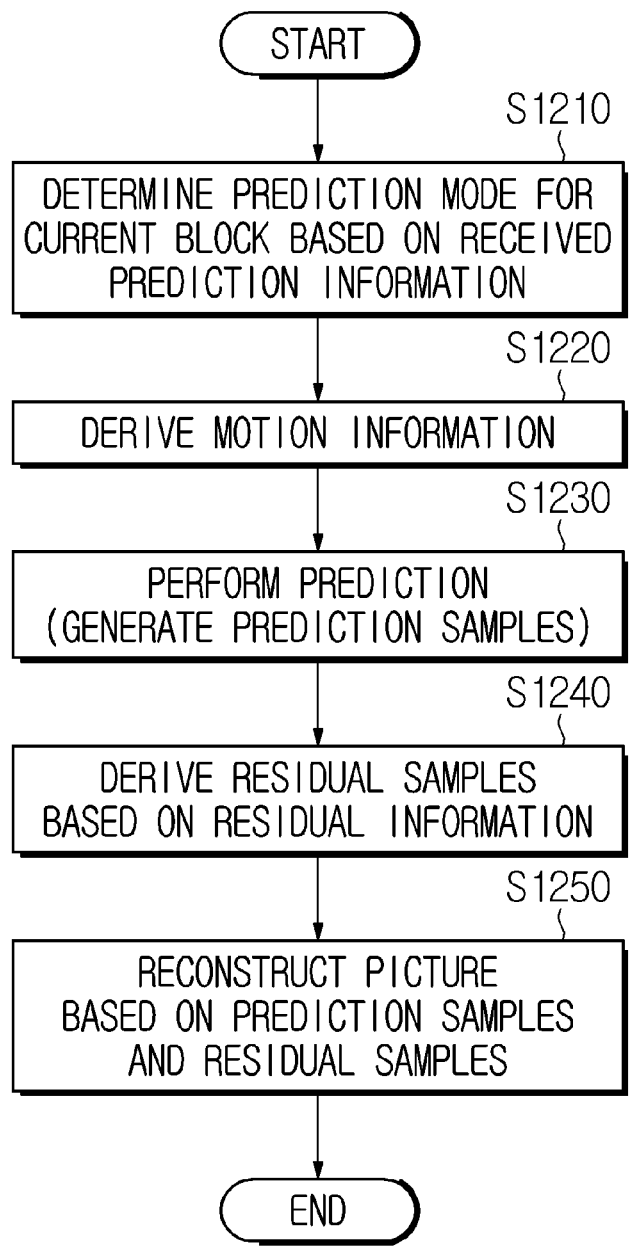
FIG. 12 is a view illustrating a decoding method using inter prediction according to an embodiment.

A video/image encoding procedure based on inter prediction and an inter prediction unit in an encoding apparatus may schematically include the following, for example. It will be described with reference to FIG. 11. The encoding apparatus performs inter prediction with respect to a current block (S1100). The image encoding apparatus may derive an inter prediction mode and motion information of the current block and generate prediction samples of the current block. Here, inter prediction mode determination, motion information derivation and prediction samples generation procedures may be simultaneously performed or any one thereof may be performed before the other procedures. For example, the inter prediction unit of the encoding apparatus may include a prediction mode determination unit, a motion information derivation unit and a prediction sample derivation unit, and the prediction mode determination unit may determine the prediction mode of the current block, the motion information derivation unit may derive the motion information of the current block, and the prediction sample derivation unit may derive the prediction samples of the current block. For example, the inter prediction unit of the encoding apparatus may search for a block similar to the current block within a predetermined area (search area) of reference pictures through motion estimation, and derive a reference block whose difference from the current block is equal to or less than a predetermined criterion or a minimum. Based on this, a reference picture index indicating a reference picture in which the reference block is located may be derived, and a motion vector may be derived based on a position difference between the reference block and the current block. The encoding apparatus may determine a mode applying to the current block among various prediction modes. The encoding apparatus may compare RD costs for the various prediction modes and determine an optimal prediction mode of the current block.

For example, when a skip mode or a merge mode applies to the current block, the encoding apparatus may construct a merge candidate list and derive a reference block whose difference from the current block is equal to or less than a predetermined criterion or a minimum, among reference blocks indicated by merge candidates included in the merge candidate list. In this case, a merge candidate associated with the derived reference block may be selected, and merge index information indicating the selected merge candidate may be generated and signaled to the decoding apparatus. The motion information of the current block may be derived using the motion information of the selected merge candidate.

As another example, when an (A)MVP mode applies to the current block, the encoding apparatus may construct an (A)mvp candidate list and derive a motion vector of an mvp candidate selected from among mvp candidates included in the (a)MVP candidate list. In this case, for example, the motion vector indicating the reference block derived by the above-described motion estimation may be used as the motion vector of the current block, an mvp candidate with a motion vector having a smallest difference from the motion vector of the current block among the mvp candidates may be the selected mvp candidate. A motion vector difference (MVD) which is a difference obtained by subtracting the mvp from the motion vector of the current block may be derived. In this case, information on the MVD may be signaled to the decoding apparatus. In addition, when applying the (A)MVP mode, the value of the reference picture index may be constructed as reference picture index information and separately signaled to the decoding apparatus.

The encoding apparatus may derive residual samples based on the prediction samples (S1120). The encoding apparatus may derive the residual samples through comparison between original samples of the current block and the prediction samples.

The encoding apparatus may encode image information including prediction information and residual information (S1130). The encoding apparatus may output the encoded image information in the form of a bitstream. The prediction information may include prediction mode information (e.g., skip flag, merge flag or mode index, etc.) and information on motion information as information related to the prediction procedure. The information on the motion information may include candidate selection information (e.g., merge index, mvp flag or mvp index) which is information for deriving a motion vector. In addition, the information on the motion information may include information on the above-described MVD and/or reference picture index information. In addition, the information on the motion information may include information indicating whether to apply L0 prediction, L1 prediction or bi prediction. The residual information is information on the residual samples. The residual information may include information on quantized transform coefficients for the residual samples.

The output bitstream may be stored in a (digital) storage medium and transmitted to the decoding apparatus or may be transmitted to the decoding apparatus via a network.

As described above, the encoding apparatus may generate a reconstructed picture (including reconstructed samples and a reconstructed block) based on the reference samples and the residual samples. This is for the encoding apparatus to derive the same prediction result as that performed by the decoding apparatus, thereby increasing coding efficiency. Accordingly, the encoding apparatus may store the reconstructed picture (or the reconstructed samples and the reconstructed block) in a memory and use the same as a reference picture for inter prediction. As described above, an in-loop filtering procedure is further applicable to the reconstructed picture.

A video/image decoding procedure based on inter prediction and an inter prediction unit in a decoding apparatus may schematically include the following, for example.

The decoding apparatus may perform operation corresponding to operation performed by the encoding apparatus. The decoding apparatus may perform prediction with respect to a current block based on received prediction information and derive prediction samples.

Specifically, the decoding apparatus may determine the prediction mode of the current block based on the received prediction information (S1210). The image decoding apparatus may determine which inter prediction mode applies to the current block based on the prediction mode information in the prediction information.

For example, it may be determined whether the merge mode or the (A)MVP mode applies to the current block based on the merge flag. Alternatively, one of various inter prediction mode candidates may be selected based on the mode index. The inter prediction mode candidates may include a skip mode, a merge mode and/or an (A)MVP mode or may include various inter prediction modes which will be described below.

The decoding apparatus may derive the motion information of the current block based on the determined inter prediction mode (S1220). For example, when the skip mode or the merge mode applies to the current block, the decoding apparatus may construct a merge candidate list, which will be described below, and select one of merge candidates included in the merge candidate list. The selection may be performed based on the above-described candidate selection information (merge index). The motion information of the current block may be derived using the motion information of the selected merge candidate. The motion information of the selected merge candidate may be used as the motion information of the current block.

As another example, when the (A)MVP mode applies to the current block, the decoding apparatus may construct an (A)MVP candidate list and use the motion vector of an mvp candidate selected from among mvp candidates included in the (A)MVP candidate list as an mvp of the current block. The selection may be performed based on the above-described candidate selection information (mvp flag or mvp index). In this case, the MVD of the current block may be derived based on information on the MVD, and the motion vector of the current block may be derived based on mvp and MVD of the current block. In addition, the reference picture index of the current block may be derived based on the reference picture index information. A picture indicated by the reference picture index in the reference picture list of the current block may be derived as a reference picture referenced for inter prediction of the current block.

Meanwhile, as described below, the motion information of the current block may be derived without candidate list construction and, in this case, the motion information of the current block may be derived according to the disclosed procedure in the below-described prediction mode. In this case, the above-described candidate list construction may be omitted.

The image decoding apparatus may generate prediction samples of the current block based on motion information of the current block (S1230). In this case, the reference picture may be derived based on the reference picture index of the current block, and the prediction samples of the current block may be derived using the samples of the reference block indicated by the motion vector of the current block on the reference picture. In this case, as described below, some cases, a prediction sample filtering procedure may be further performed with respect to all or some of the prediction samples of the current block.

For example, the inter prediction unit of the decoding apparatus may include a prediction mode determination unit, a motion information derivation unit and a prediction sample derivation unit, and, the prediction mode determination unit may determine the prediction mode of the current block based on the received prediction mode information, the motion information derivation unit may derive the motion information (a motion vector and/or a reference picture index, etc.) of the current block based on the received motion information, and the prediction sample derivation unit may derive the prediction samples of the current block.

The decoding apparatus may generate residual samples of the current block based the received residual information (S1240). The decoding apparatus may generate the reconstructed samples of the current block based on the prediction samples and the residual samples and generate a reconstructed picture based on this (S1250). Thereafter, an in-loop filtering procedure is applicable to the reconstructed picture, as described above As described above, the inter prediction procedure may include step of determining an inter prediction mode, step of deriving motion information according to the determined prediction mode, and step of performing prediction (generating prediction samples) based on the derived motion information. The inter prediction procedure may be performed by the encoding apparatus and the decoding apparatus, as described above.

Quantization/Dequantization

As described above, the quantizer of the encoding apparatus may derive quantized transform coefficients by applying quantization to transform coefficients, and the dequantizer of the encoding apparatus or the dequantizer of the decoding apparatus may derive transform coefficients by applying dequantization to the quantized transform coefficients.

In encoding and decoding of a moving image/still image, a quantization rate may be changed and a compression rate may be adjusted using the changed quantization rate. From the viewpoint of implementation, in consideration of complexity, instead of directly using the quantization rate, a quantization parameter (QP) may be used. For example, quantization parameters having integer values from 0 to 63 may be used and each quantization parameter value may correspond to an actual quantization rate. In addition, a quantization parameter $QP_Y$ for a luma component (luma sample) and a quantization parameter $QP_C$ for a chroma component (chroma sample) may be differently set.

In the quantization process, a transform coefficient C may be received and divided by a quantization rate Qstep, thereby obtaining a quantized transform. In this case, the quantization rate may be multiplied by a scale in consideration of computational complexity to make an integer, and shift operation may be performed by a value corresponding to the scale value. A quantization scale may be derived based on a product of the quantization rate and the scale value. That is, the quantization scale may be derived according to QP. By applying the quantization scale to the transform coefficient C, a quantized transform coefficient C' may be derived.

The dequantization process is an inverse process of the quantization process. By multiplying the quantized transform coefficient C' by the quantization rate Qstep, thereby obtaining a reconstructed transform coefficient C". In addition, a level scale may be derived according to the quantization parameter, and the level scale may be applied to the quantized transform coefficient C', thereby deriving the reconstructed transform coefficient C". The reconstructed transform coefficient C" may be slightly different from an initial transform coefficient C due to loss of the transform and/or quantization process. Accordingly, the even in the encoding apparatus, dequantization may be performed in the same manner as in the decoding apparatus.

Meanwhile, adaptive frequency weighting quantization technology for adjusting a quantization strength according to the frequency may be applied. The adaptive frequency weighting quantization technology refers to a method of differently applying a quantization strength according to the frequency. In adaptive frequency weighting quantization, the quantization strength may be differently applied according to the frequency using a predefined quantization scaling matrix. That is, the above-described quantization/dequantization process may be performed based on the quantization scaling matrix. For example, different quantization scaling matrices may be used according to the size of the current block and/or whether a prediction mode applied to the current block is inter prediction or intra prediction in order to generate the residual signal of the current block. The quantization scaling matrix may be referred to as a quantization matrix or a scaling matrix. The quantization scaling matrix may be predefined. In addition, for frequency adaptive scaling, frequency quantization scale information for the quantization scaling matrix may be constructed/encoded in the encoding apparatus and signaled to the decoding apparatus. The frequency quantization scale information may be referred to as quantization scaling information. The frequency quantization scale information may include scaling list data scaling_list_data. The (modified) quantization scaling matrix may be derived based on the scaling list data. In addition, the frequency quantization scale information may include a present flag indicating whether the scaling list data is present. Alternatively, when the scaling list data is signaled at a higher level (e.g., SPS), information indicating whether the scaling list data is modified at a lower level (e.g., PPS or tile group header, etc.) may be further included.

Transform/Inverse Transform

As described above, the encoding apparatus may derive a residual block (residual samples) based on a block (prediction blocks) predicted through intra/inter/IBC prediction, and derive quantized transform coefficients by applying transform and quantization to the derived residual samples. Information on the quantized transform coefficients (residual information) may be included and encoded in a residual coding syntax and output in the form of a bitstream. The decoding apparatus may acquire and decode information on the quantized transform coefficients (residual information) from the bitstream to derive quantized transform coefficients. The decoding apparatus may derive residual samples through dequantization/inverse transform based on the quantized transform coefficients. As described above, at least one of quantization/dequantization and/or transform/inverse transform may be skipped. When transform/inverse transform is skipped, the transform coefficient may be referred to as a coefficient or a residual coefficient or may still be referred to a transform coefficient for uniformity of expression. Whether transform/inverse transform is skipped may be signaled based on a transform skip flag (e.g., transform_skip_flag).

Transform/inverse transform may be performed based on transform kernel(s). For example, a multiple transform selection (MTS) scheme for performing transform/inverse transform is applicable. In this case, some of a plurality of transform kernel sets may be selected and applied to a current block. A transform kernel may be referred to as various terms such as a transform matrix or a transform type. For example, the transform kernel set may indicate a combination of a vertical-direction transform kernel (vertical transform kernel) and a horizontal-direction transform kernel (horizontal transform kernel).

Transform/inverse transform may be performed in units of CU or TU. That is, transform/inverse transform is applicable to residual samples in a CU or residual samples in a TU. A CU size may be equal to a TU size or a plurality of TUs may be present in a CU region. Meanwhile, the CU size may generally indicate a luma component (sample) CB size. The TU size may generally indicate a luma component (sample) TB size. A chroma component (sample) CB or TB size may be derived based on the luma component (sample) CB or TB size according to a component ratio according to a color format (chroma format) (e.g., 4:4:4, 4:2:2, 4:2:0, etc.). The TU size may be derived based on maxTbSize. For example, when the CU size is greater than maxTbSize, a plurality of TUs (TBs) of maxTbSize may be derived from the CU and transform/inverse transform may be performed in units of TU (TB). maxTbSize may be considered to determine whether to apply various intra prediction types such as ISP. Information on maxTbSize may be predetermined or may be generated and encoded in the encoding apparatus and signaled to the encoding apparatus.

Entropy Coding

All or some of video/image information may be entropy-encoded by the entropy encoder 190 as described above with reference to FIG. 2, and all or some of the video/image information described with reference to FIG. 3 may be entropy-decoded by the entropy decoder 310. In this case, the video/image information may be encoded/decoded in units of a syntax element. In the present disclosure, encoding/decoding information may include encoding/decoding by the method described in this paragraph.

Figure 13:
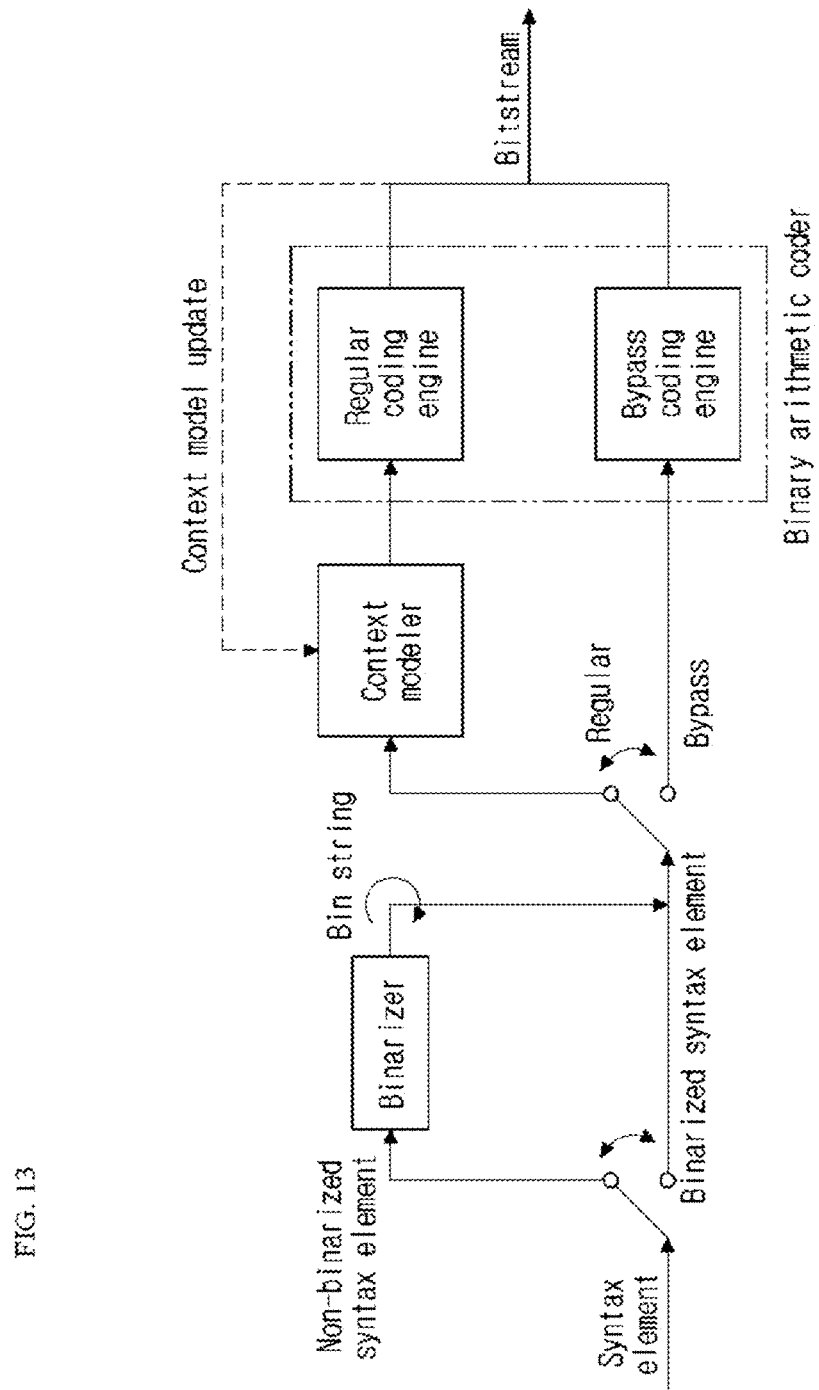
FIG. 13 is a block diagram of CABAC according to an embodiment for encoding one syntax element.

FIG. 13 is a block diagram of a CABAC for encoding one syntax element. In the encoding process of CABAC, first, when an input signal is a syntax element other than a binary value, the input signal may be transformed into a binary value through binarization. When the input signal already has a binary value, binarization may be bypassed. Here, a binary number 0 or 1 configuring a binary value may be referred to as a bin. For example, when a binary string (bin string) after binarization is 110, each of 1, 1 and 0 may be referred to as one bin. The bin(s) for one syntax element may represent the value of a corresponding syntax element.

The binarized bins may be input to a regular coding engine or a bypass coding engine. The regular coding engine may allocate a context model reflecting a probability value to a corresponding bin and encode the corresponding bit based on the allocated context model. The regular coding engine may code each bin and then update a probability model for the corresponding bin. The bins coded in this way may be referred to as context-coded bins. The bypass coding engine may bypass a procedure for estimating a probability with respect to an input bin and a procedure for updating a probability mode applied to a corresponding bin after coding. The bypass coding engine may code an input bin by applying a uniform probability distribution (e.g., 50:50) instead of allocating a context, thereby improving a coding speed. Bins coded in this way may be referred to as a bypass bin. A context model may be allocated and updated for each context-coded (regularly coded) bin, and the context model may be indicated based on ctxidx or ctxInc. ctxidx may be derived based on ctxInc. Specifically, for example, a context index ctxidx indicating the context model for each of the regularly coded bins may be derived as a sum of a context index increment (ctxInc) and a context index offset (ctxIdxOffset). Here, ctxInc may be differently derived for each bin. ctxIdxOffset may be represented by a lowest value of ctxIdx. The lowest value of ctxIdx may be referred to as an initial value initValue of ctxIdx. ctxIdxOffset is generally a value used to be distinguished from context models for other syntax elements, and a context model for one syntax element may be distinguished/derived based on ctxinc.

In the entropy encoding procedure, whether encoding is performed through the regular coding engine or the bypass coding engine may be determined and a coding path may be switched. Entropy decoding may be performed in the reverse order of the same process as entropy encoding.

Figure 14:
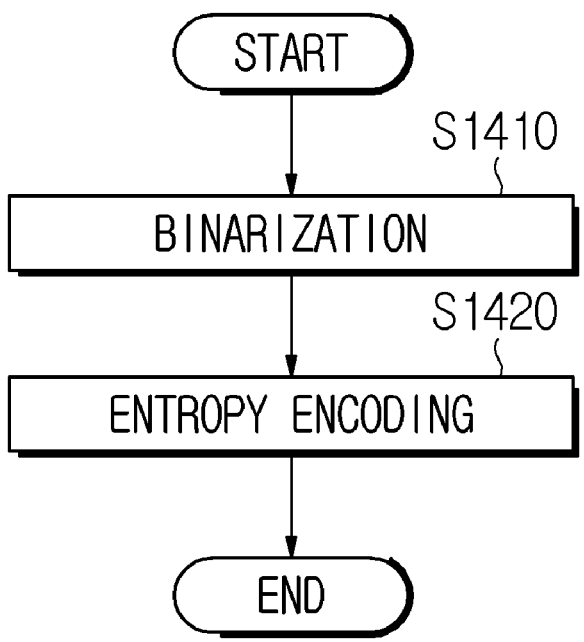
FIGS. 14 to 17 are views illustrating entropy encoding and decoding according to an embodiment.
Figure 15:
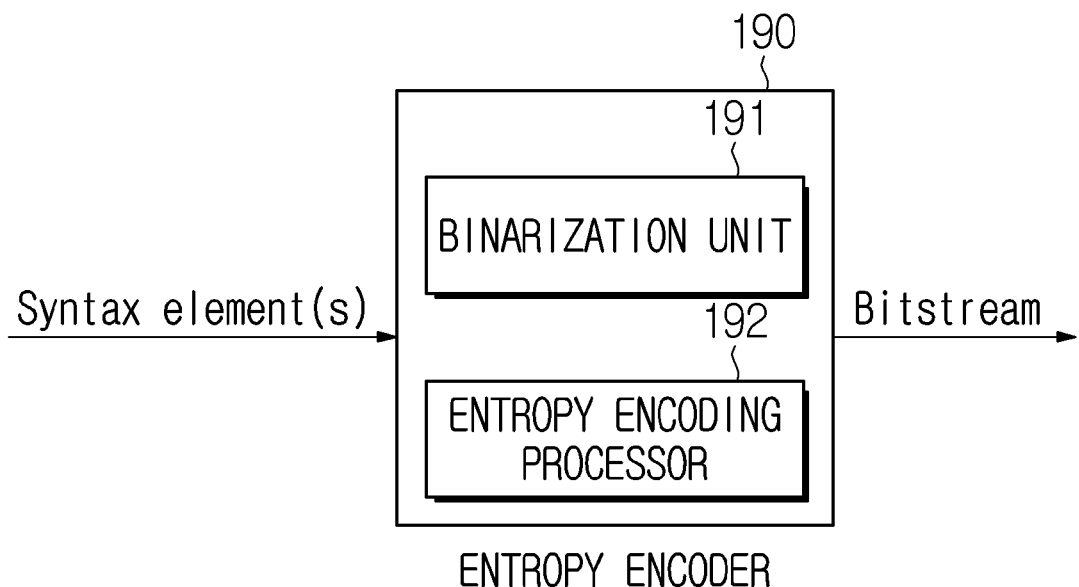

The above-described entropy coding may be performed, for example, as shown in FIGS. 14 and 15. Referring to FIGS. 14 and 15, the encoding apparatus (entropy encoder) may perform an entropy coding procedure for image/video information. The image/video information may include partitioning related information, prediction related information (e.g., inter/intra prediction distinction information, intra prediction mode information, inter prediction mode information, etc.), residual information, in-loop filtering related information, etc. or may include various syntax elements related thereto. Entropy coding may be performed in units of a syntax element. Steps S1410 to S1420 of FIG. 14 may be performed by the entropy encoder 190 of the encoding apparatus of FIG. 2.

The encoding apparatus may perform binarization with respect to a target syntax element (S1410). Here, binarization may be based on various binarization methods such as a Truncated Rice binarization process, Fixed-length binarization process, etc., and the binarization method for the target syntax element may be predefined. The binarization procedure may be performed by a binarization unit 191 in the entropy encoder 190.

The encoding apparatus may entropy encoding with respect to the target syntax element (S1420). The encoding apparatus may perform regular coding based (context based) or bypass coding based encoding with respect to a bin string of the target syntax element based on an entropy coding technique such as CABAC (context-adaptive arithmetic coding) or CAVLC (context-adaptive variable length coding), and the output thereof may be included in a bitstream. The entropy encoding procedure may be performed by an entropy encoding processor 192 in the entropy encoder 190. As described above, the bitstream may be transmitted to the decoding apparatus through a (digital) storage medium or a network.

Figure 16:
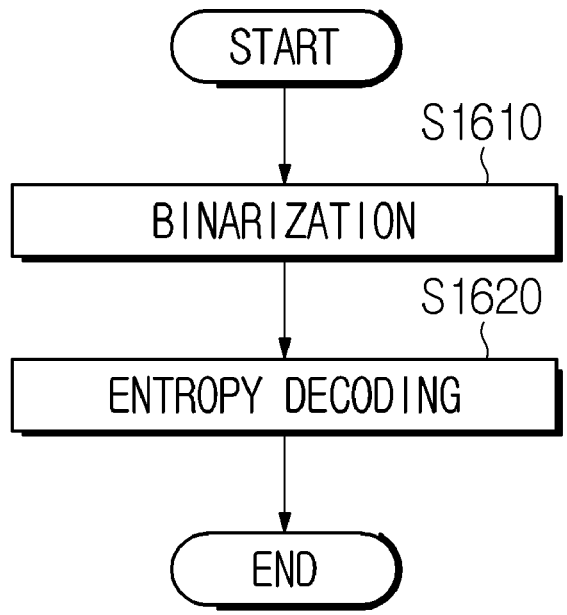
Figure 17:
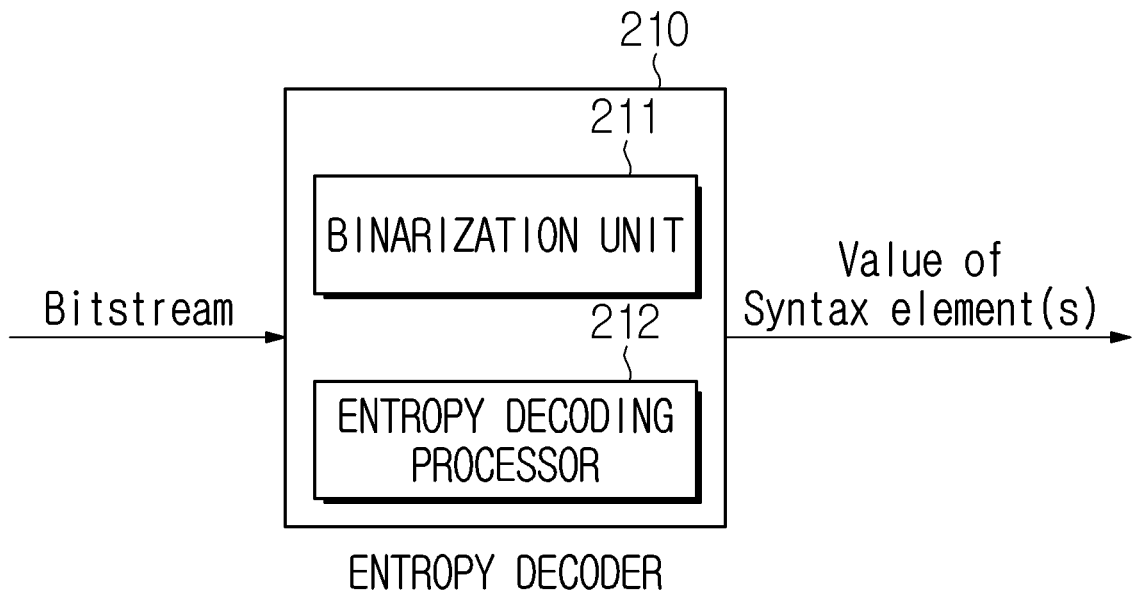

Referring to FIGS. 16 and 17, the decoding apparatus (entropy decoder) may decode encoded image/video information. The image/video information may include partitioning related information, prediction related information (e.g., inter/intra prediction distinction information, intra prediction mode information, inter prediction mode information, etc.), residual information, in-loop filtering related information, etc. or may include various syntax elements related thereto. Entropy coding may be performed in units of a syntax element. Steps S1610 to S1620 of FIG. 16 may be performed by the entropy decoder 210 of the decoding apparatus of FIG. 3.

The decoding apparatus may perform binarization with respect to a target syntax element (S1610). Here, binarization may be based on various binarization methods such as a Truncated Rice binarization process, Fixed-length binarization process, etc., and the binarization method for the target syntax element may be predefined. The decoding apparatus may derive available bin strings (bin string candidates) for available values of the target syntax element through the binarization procedure. The binarization procedure may be performed by a binarization unit 211 in the entropy decoder 210.

The decoding apparatus may perform entropy decoding with respect to the target syntax element (S1620). The decoding apparatus may compare the derived bin string with available bin strings for a corresponding syntax element, while sequentially decoding and parsing the bins for the target syntax element from input bit(s) in the bitstream. If the derived bin string is equal to one of the available bin strings, a value corresponding to the corresponding bin string may be derived as a value of the corresponding syntax element. If not, the above-described procedure may be performed again after a next bit in the bitstream is further parsed. Through such a process, corresponding information may be signaled using a variable length bit without using a start or end bit for specific information (specific syntax element) in the bitstream. Through this, a relatively fewer bits may be allocated to a low value and overall coding efficiency may be improved.

The decoding apparatus may perform context based or bypass based decoding with respect to the bins in the bin string from the bitstream based on an entropy coding technique such as CABAC or CAVLC. The entropy decoding procedure may be performed by an entropy decoding processor 212 in the entropy decoder 210. The bitstream may include a variety of information for image/video decoding as described above. As described above, the bitstream may be transmitted to the decoding apparatus through a (digital) storage medium or a network.

In the present disclosure, a table (syntax table) including syntax elements may be used to indicate signaling of information from the encoding apparatus to the decoding apparatus. The order of the syntax elements of the table including the syntax elements used in the present disclosure may indicate the parsing order of the syntax elements from the bitstream. The encoding apparatus may construct and encode the syntax element such that the decoding apparatus parses the syntax element in the parsing order, and the decoding apparatus may parse and decode the syntax elements of the corresponding syntax table from the bitstream according to the parsing order and obtain the values of the syntax elements.

General Image/Video Coding Procedure

In image/video coding, a picture configuring an image/video may be encoded/decoded according to a decoding order. A picture order corresponding to an output order of the decoded picture may be set differently from the decoding order, and, based on this, not only forward prediction but also backward prediction may be performed during inter prediction.

Figure 18:
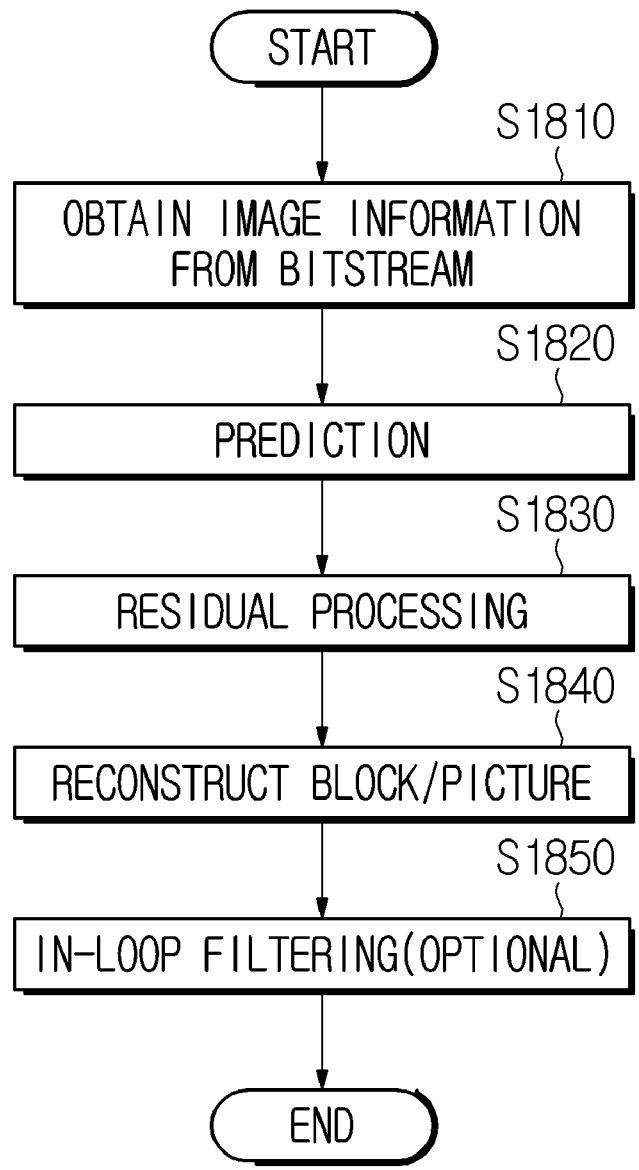
FIGS. 18 and 19 are views showing an example of a picture decoding and encoding procedure according to an embodiment.

FIG. 18 shows an example of a schematic picture decoding procedure, to which embodiment(s) of the present disclosure is applicable. In FIG. 18, S1810 may be performed in the entropy decoder 210 of the decoding apparatus, S1820 may be performed in a prediction unit including the intra prediction unit 265 and the inter prediction unit 260, S1830 may be performed in a residual processor including the dequantizer 220 and the inverse transformer 230, S1840 may be performed in the adder 235, and S1850 may be performed in the filter 240. S1810 may include the information decoding procedure described in the present disclosure, S1820 may include the inter/intra prediction procedure described in the present disclosure, S1830 may include a residual processing procedure described in the present disclosure, S1840 may include the block/picture reconstruction procedure described in the present disclosure, and S1850 may include the in-loop filtering procedure described in the present disclosure.

Referring to FIG. 18, the picture decoding procedure may schematically include a procedure (S1810) for obtaining image/video information (through decoding) from a bitstream, a picture reconstruction procedure (S1820 to S1840) and an in-loop filtering procedure (S1850) for a reconstructed picture. The picture reconstruction procedure may be performed based on prediction samples and residual samples obtained through inter/intra prediction (S1820) and residual processing (S1830) (dequantization and inverse transform of the quantized transform coefficient) described in the present disclosure. A modified reconstructed picture may be generated through the in-loop filtering procedure for the reconstructed picture generated through the picture reconstruction procedure, the modified reconstructed picture may be output as a decoded picture, stored in a decoded picture buffer or memory 250 of the decoding apparatus and used as a reference picture in the inter prediction procedure when decoding the picture later. In some cases, the in-loop filtering procedure may be omitted. In this case, the reconstructed picture may be output as a decoded picture, stored in a decoded picture buffer or memory 250 of the decoding apparatus, and used as a reference picture in the inter prediction procedure when decoding the picture later. The in-loop filtering procedure (S1850) may include a deblocking filtering procedure, a sample adaptive offset (SAO) procedure, an adaptive loop filter (ALF) procedure and/or a bi-lateral filter procedure, as described above, some or all of which may be omitted. In addition, one or some of the deblocking filtering procedure, the sample adaptive offset (SAO) procedure, the adaptive loop filter (ALF) procedure and/or the bi-lateral filter procedure may be sequentially applied or all of them may be sequentially applied. For example, after the deblocking filtering procedure is applied to the reconstructed picture, the SAO procedure may be performed. Alternatively, for example, after the deblocking filtering procedure is applied to the reconstructed picture, the ALF procedure may be performed. This may be similarly performed even in the encoding apparatus.

Figure 19:
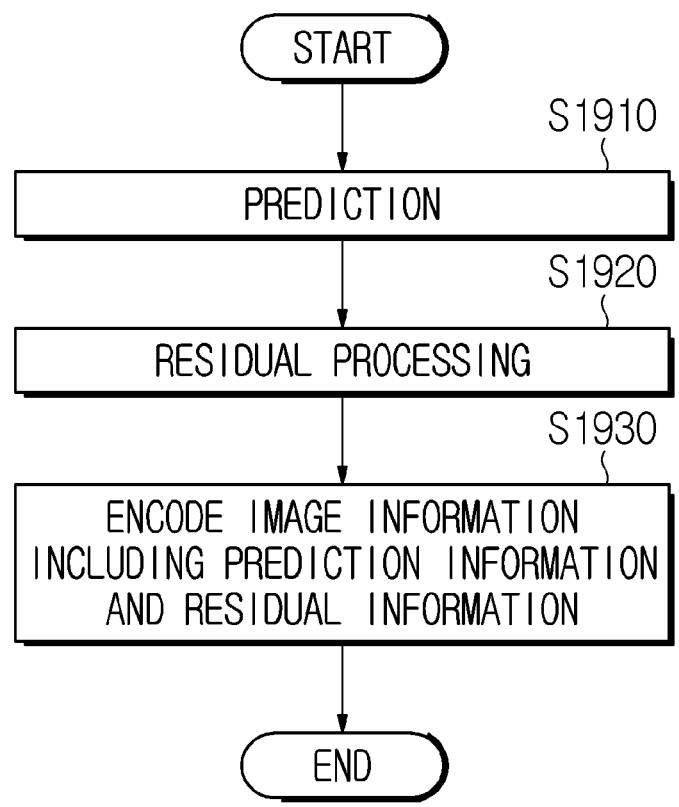

FIG. 19 shows an example of a schematic picture encoding procedure, to which embodiment(s) of the present disclosure is applicable. In FIG. 19, S1910 may be performed in the prediction unit including the intra prediction unit 185 or inter prediction unit 180 of the encoding apparatus described above with reference to FIG. 2, S1920 may be performed in a residual processor including the transformer 120 and/or the quantizer 130, and S1930 may be performed in the entropy encoder 190. S1910 may include the inter/intra prediction procedure described in the present disclosure, S1920 may include the residual processing procedure described in the present disclosure, and S1930 may include the information encoding procedure described in the present disclosure.

Referring to FIG. 19, the picture encoding procedure may schematically include not only a procedure for encoding and outputting information for picture reconstruction (e.g., prediction information, residual information, partitioning information, etc.) in the form of a bitstream but also a procedure for generating a reconstructed picture for a current picture and a procedure (optional) for applying in-loop filtering to a reconstructed picture, as described with respect to FIG. 2. The encoding apparatus may derive (modified) residual samples from a quantized transform coefficient through the dequantizer 140 and the inverse transformer 150, and generate the reconstructed picture based on the prediction samples which are output of S1910 and the (modified) residual samples. The reconstructed picture generated in this way may be equal to the reconstructed picture generated in the decoding apparatus. The modified reconstructed picture may be generated through the in-loop filtering procedure for the reconstructed picture, may be stored in the decoded picture buffer or memory 170, and may be used as a reference picture in the inter prediction procedure when encoding the picture later, similarly to the decoding apparatus. As described above, in some cases, some or all of the in-loop filtering procedure may be omitted. When the in-loop filtering procedure is performed, (in-loop) filtering related information (parameter) may be encoded in the entropy encoder 190 and output in the form of a bitstream, and the decoding apparatus may perform the in-loop filtering procedure using the same method as the encoding apparatus based on the filtering related information.

Through such an in-loop filtering procedure, noise occurring during image/video coding, such as blocking artifact and ringing artifact, may be reduced and subjective/objective visual quality may be improved. In addition, by performing the in-loop filtering procedure in both the encoding apparatus and the decoding apparatus, the encoding apparatus and the decoding apparatus may derive the same prediction result, picture coding reliability may be increased and the amount of data to be transmitted for picture coding may be reduced.

As described above, the picture reconstruction procedure may be performed not only in the decoding apparatus but also in the encoding apparatus. A reconstructed block may be generated based on intra prediction/inter prediction in units of blocks, and a reconstructed picture including reconstructed blocks may be generated. When a current picture/slice/tile group is an I picture/slice/tile group, blocks included in the current picture/slice/tile group may be reconstructed based on only intra prediction. Meanwhile, when the current picture/slice/tile group is a P or B picture/slice/tile group, blocks included in the current picture/slice/tile group may be reconstructed based on intra prediction or inter prediction. In this case, inter prediction may be applied to some blocks in the current picture/slice/tile group and intra prediction may be applied to the remaining blocks. The color component of the picture may include a luma component and a chroma component and the methods and embodiments of the present disclosure are applicable to the luma component and the chroma component unless explicitly limited in the present disclosure.

Example of Coding Layer and Structure

A coded video/image according to the present disclosure may be processed, for example, according to a coding layer and structure which will be described below.

Figure 20:
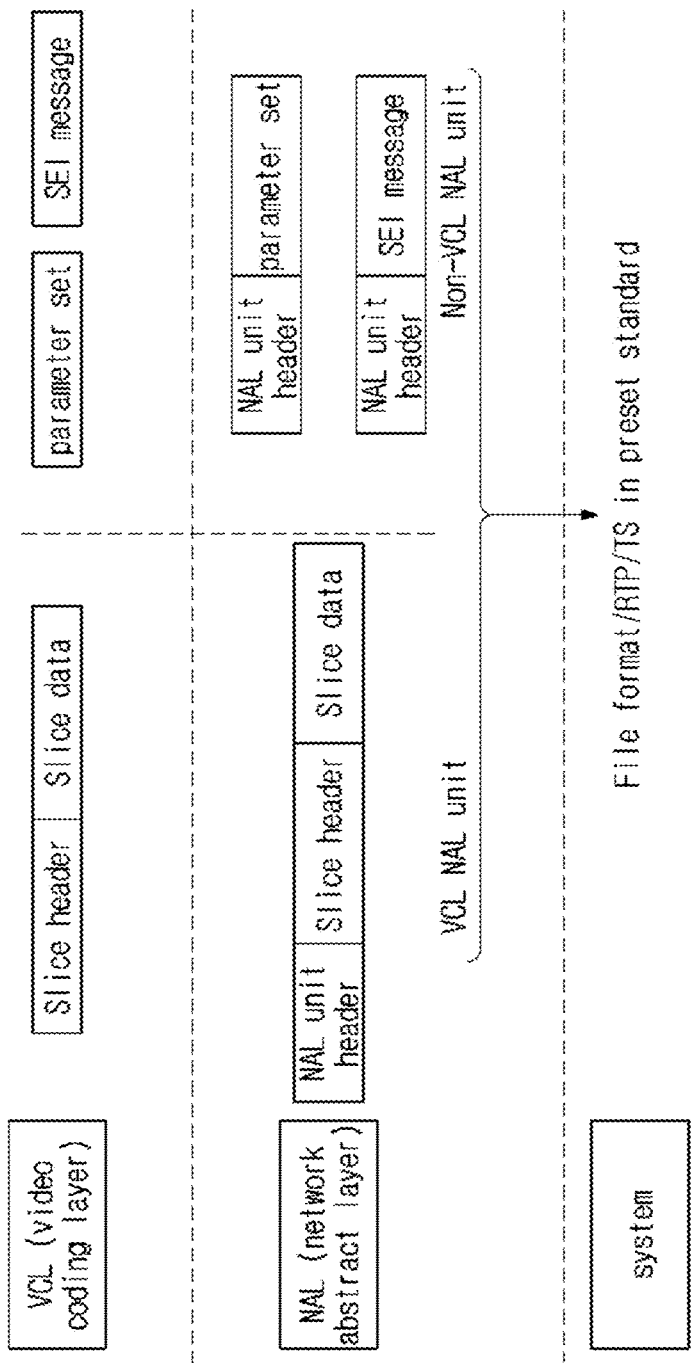
FIG. 20 is a view showing a layer structure for a coded image.

FIG. 20 is a view showing a layer structure for a coded image. The coded image may be classified into a video coding layer (VCL) for an image decoding process and handling itself, a lower system for transmitting and storing encoded information, and a network abstraction layer (NAL) present between the VCL and the lower system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated.

In the NAL, header information (NAL unit header) may be added to a raw byte sequence payload (RBSP) generated in the VCL to generate an NAL unit. In this case, the RBSP refers to slice data, a parameter set, an SEI message generated in the VCL. The NAL unit header may include NAL unit type information specified according to RBSP data included in a corresponding NAL unit.

As shown in the figure, the NAL unit may be classified into a VCL NAL unit and a non-VCL NAL unit according to the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header information and transmitted through a network according to the data standard of the lower system. For example, the NAL unit may be modified into a data format of a predetermined standard, such as H.266/VVC file format, RIP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signaled.

For example, this may be largely classified into a VCL NAL unit type and a non-VCL NAL unit type depending on whether the NAL unit includes information on an image (slice data). The VCL NAL unit type may be classified according to the property and type of the picture included in the VCL NAL unit, and the Non-VCL NAL unit type may be classified according to the type of a parameter set.

An example of the NAL unit type specified according to the type of the parameter set/information included in the Non-VCL NAL unit type will be listed below.

DCI (Decoding capability information) NAL unit: Type for NAL unit including DCI

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

APS (Adaptation Parameter Set) NAL unit: Type for NAL unit including APS

PH (Picture header) NAL unit: Type for NAL unit including PH

The above-described NAL unit types may have syntax information for a NAL unit type, and the syntax information may be stored in a NAL unit header and signaled. For example, the syntax information may be nal_unit_type, and the NAL unit types may be specified as nal_unit_type values.

Meanwhile, as described above, one picture may include a plurality of slices, and one slice may include a slice header and slice data. In this case, one picture header may be further added to a plurality of slices (slice header and slice data set) in one picture. The picture header (picture header syntax) may include information/parameters commonly applicable to the picture.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may information/parameters commonly applicable to multiple layers. The DCI (DCI syntax) may include information/parameters commonly applicable to an overall video. The DCI may include information/parameters related to decoding capability. In the present disclosure, a high level syntax (HLS) may include at least one of the APS syntax, the PPS syntax, the SPS syntax, the VPS syntax, the DCI syntax, the picture header syntax or the slice header syntax. Meanwhile, in the present disclosure, a low level syntax (LLS) may include, for example, a slice data syntax, a CTU syntax, a coding unit syntax, a transform unit syntax, etc.

In the present disclosure, image/video information encoded in the encoding apparatus and signaled to the decoding apparatus in the form of a bitstream may include not only in-picture partitioning related information, intra/inter prediction information, residual information, in-loop filtering information but also information on the slice header, information on the picture header, information on the APS, information on the PPS, information on the SPS, information on the VPS and/or information on the DCI. In addition, the image/video information may further include general constraint information and/or information on a NAL unit header.

Partitioning of Picture Using Subpicture, Slice and Tile

One picture may be partitioned into at least one tile row and at least one tile column. One tile may be composed of a sequence of CTUs and may cover a rectangular region of one picture.

The slice may be composed of an integer number of complete tiles or an integer number of consecutive complete CTU rows in one picture.

For the slice, two modes may be supported: one may be called a raster-scan slice mode and the other may be called a rectangular slice mode. In the raster-scan slice mode, one slice may include a complete tile sequence present in one picture in the tile raster scan order. In the rectangular slice mode, one slice may include a plurality of complete tiles assembled to form a rectangular region of a picture or a plurality of consecutive complete CTU rows of one tile assembled to form a rectangular region of a picture. Tiles in the rectangular slice may be scanned in the tile raster scan order in the rectangular region corresponding to the slice. The subpicture may include at least one slice assembled to cover a rectangular region of a picture.

Figure 21:
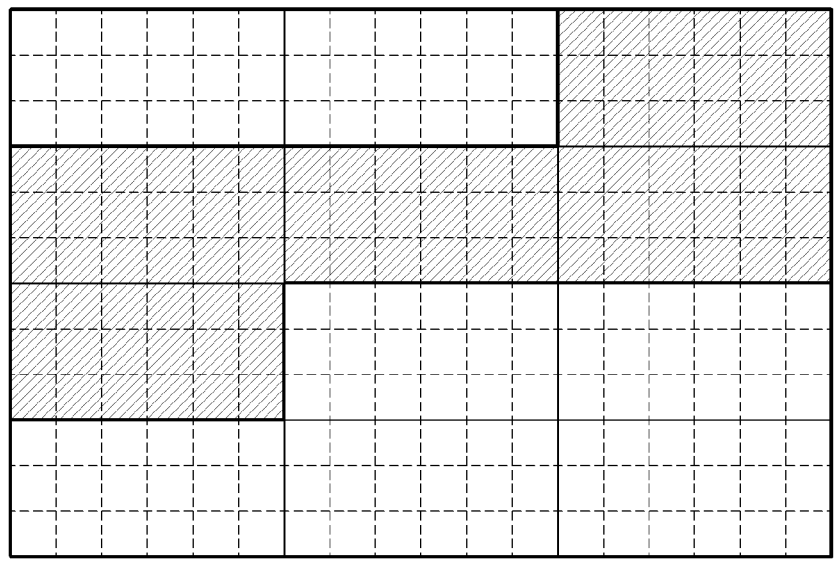
FIGS. 21 to 24 are views showing an embodiment of partitioning a picture using tiles, slices and subpictures.
Figure 22:
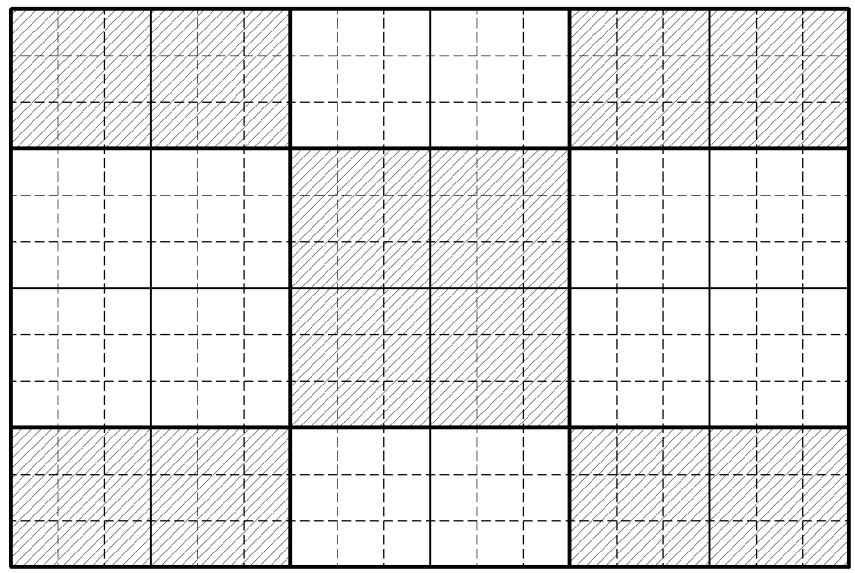
Figure 23:
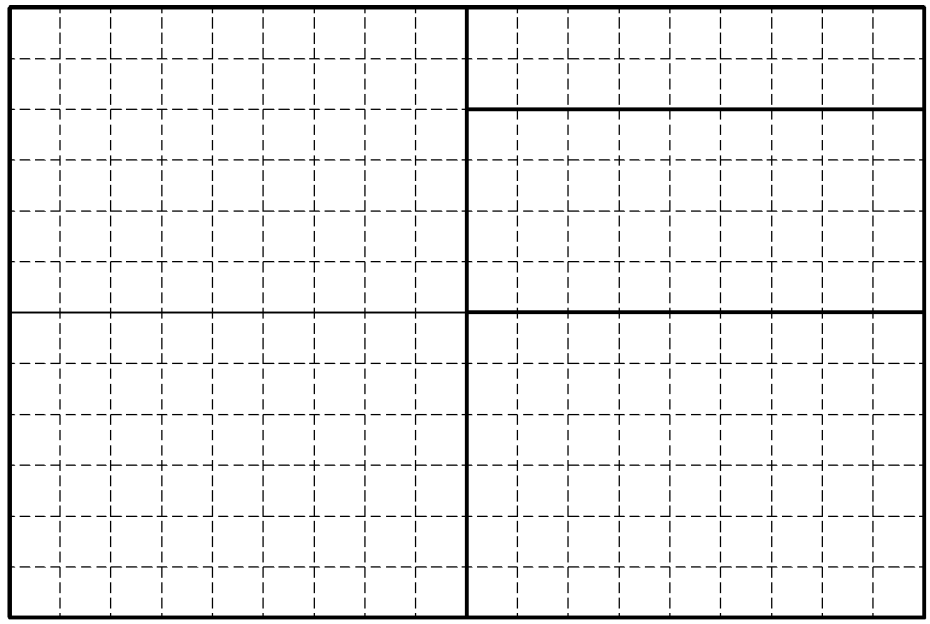

In order to describe the partitioning relationship of a picture in greater detail, a description will be given with reference to FIGS. 21 to 24. FIGS. 21 to 24 show embodiments of partitioning a picture using a tile, a slice and a subpicture. FIG. 21 shows an example of a picture partitioned into 12 tiles and three raster-scan slices. FIG. 22 shows an example of a picture partitioned into 24 tiles (six tile columns and four tile rows) and 9 rectangular slices. FIG. 23 shows an example of a picture partitioned into four tiles (two tile columns and two tile rows) and four rectangular slices.

Figure 24:
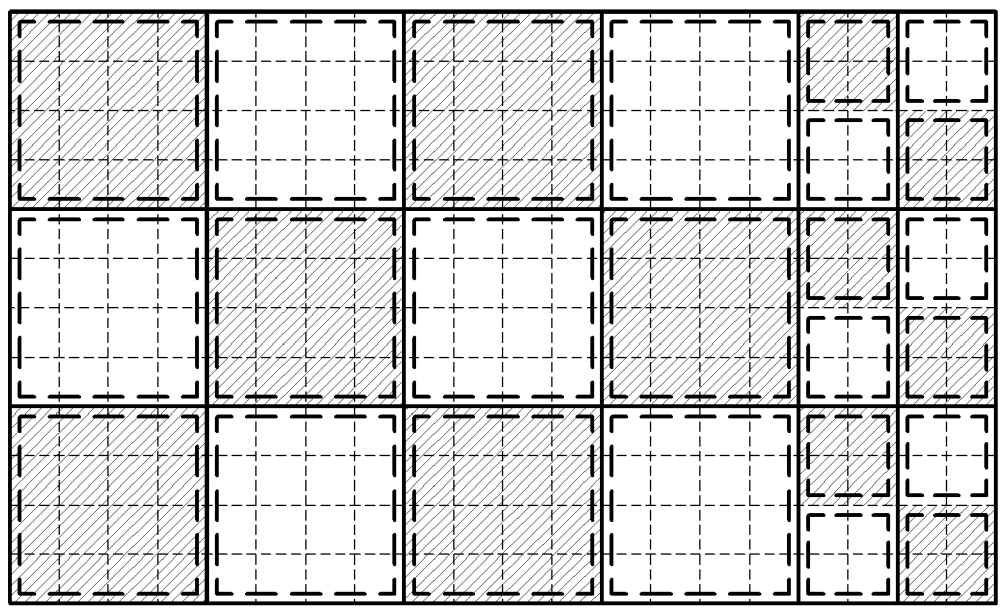

FIG. 24 shows an example of partitioning a picture into subpictures. In FIG. 24, the picture may be partitioned into 12 left tiles covering one slice composed of 4×4 CTUs and six right tiles covering vertically assembled two slices composed of 2×2 CTUs, such that one picture is partitioned into 24 slices and 24 subpictures having different areas. In the example of FIG. 24, an individual slice corresponds to an individual subpicture.

Overview of In-Loop Filtering

An in-loop filtering procedure may be performed on the reconstructed picture generated through the above-described procedure. A modified reconstructed picture may be generated through an in-loop filtering procedure, and the modified reconstructed picture may be output as a decoded picture from the decoding apparatus, may be stored in a decoded picture buffer or memory of the encoding apparatus/decoding apparatus and may be used as a reference picture in an inter prediction procedure when encoding/decoding a picture. The in-loop filtering procedure may include a deblocking filtering procedure, a sample adaptive offset (SAO) procedure, and/or an adaptive loop filter (ALF) procedure, as described above. In this case, one or some of the deblocking filtering procedure, the sample adaptive offset (SAO) procedure, the adaptive loop filter (ALF) procedure, and the bi-lateral filter procedure may be sequentially applied, or all are sequentially may be applied. For example, after the deblocking filtering procedure is applied to the reconstructed picture, the SAO procedure may be performed. Alternatively, for example, after the deblocking filtering procedure is applied to the reconstructed picture, the ALF procedure may be performed. This may also be performed in the encoding apparatus.

Deblocking filtering is a filtering technique that removes distortion at the boundary between blocks in the reconstructed picture. The deblocking filtering procedure may, for example, derive a target boundary from a reconstructed picture, determine a boundary strength bS for the target boundary, and perform deblocking filtering on the target boundary based on the bS. The bS may be determined based on a prediction mode of two blocks adjacent to the target boundary, a motion vector difference, whether a reference picture is the same, whether a non-zero effective coefficient is present, and the like.

SAO is a method of compensating for an offset difference between a reconstructed picture and an original picture in units of samples, and may be applied based on, for example, types such as a band offset and an edge offset. According to SAO, samples may be classified into different categories according to each SAO type, and an offset value may be added to each sample based on the category. Filtering information for SAO may include information on whether SAO is applied, SAO type information, SAO offset value information, and the like. SAO may be applied to the reconstructed picture after the deblocking filtering is applied.

Adaptive Loop Filter (ALF) is a technique of filtering a reconstructed picture in units of samples based on filter coefficients according to a filter shape. The encoding apparatus may determine whether to apply ALF, an ALF shape and/or an ALF filtering coefficient, etc. through comparison between the reconstructed picture and the original picture, and may signal it to the decoding apparatus. That is, the filtering information for ALF may include information on whether ALF is applied, ALF filter shape information, ALF filtering coefficient information, and the like. ALF may be applied to the reconstructed picture after the deblocking filtering is applied.

Signaling of Whether to Apply In-Loop Filtering

As described above, HLS may be encoded and/or signaled for video and/or image encoding. As described above, video/image information in this specification may be included in HLS. In addition, the image/video encoding method may be performed based on such image/video information.

In an embodiment, one picture may be partitioned in partition units such as subpictures, slices and/or tiles. In addition, whether filtering is applied to the boundary of such partition units may be signaled. For example, one picture may be partitioned into a plurality of tiles. In this case, in-loop filtering across a boundary of a tile may be performed. Alternatively, one picture may be partitioned into a plurality of slices. In this case, in-loop filtering across a boundary of a slice may be performed. In this case, whether in-loop filtering across the boundary of the tile and/or the boundary of the slice is performed may be signaled through the HLS.

FIG. 25 is a view illustrating an embodiment of syntax of a PPS for signaling whether in-loop filtering is performed at a boundary of a tile and/or a boundary of a slice. In the syntax of FIG. 25, a syntax element no_pic_partition_flag 2510 may indicate whether partitioning of a picture is applied to an individual picture referring to the PPS. For example, a first value (e.g., 0) of no_pic_partition_flag 2510 may indicate that the individual picture referring to the PPS may be partitioned into more than one tile or slice. A second value (e.g., 1) of the no_pic_partition_flag 2510 may indicate that the individual picture referring to the PPS is not partitioned. Meanwhile, the no_pic_partition_flag 2510 may be limited to have the same value for all PPSs present in one sequence.

In an embodiment, the syntax element no_pic_partition_flag 2510 may be used as a condition for signaling information for partitioning of a tile and/or slice when a picture is partitioned into more than one tile and/or slice, and this may be included in the syntax as a conditional sentence like reference numeral 2520 of FIG. 25. For example, the encoding apparatus may use the no_pic_partition_flag 2510 to signal, to the decoding apparatus, whether information on partitioning of a tile and/or a slice is included in a bitstream. In addition, when the value of no_pic_partition_flag 2510 is 1, the decoding apparatus may not parse the information on partitioning of the tile and/or slice from the bitstream. When the value of the no_pic_partition_flag 2510 is 0, the decoding apparatus may parse the information on partitioning of the tile and/or the slice from the bitstream according to additional information.

For the above implementation, when the no_pic_partition_flag 2510 indicates that the pictures may be partitioned into tiles or slices, the PPS syntax indicating that the following syntax elements may be obtained from the bitstream may be implemented as the example of FIG. 25.

A syntax element pps_log2_ctu_size_minus5 may indicate a luma coding tree block size of an individual CTU. Specifically, the encoding apparatus may determine the value of pps_log2_ctu_size_minus5 to be a value obtained by subtracting 5 from the luma coding tree block size of the individual CTU. The decoding apparatus may determine a value obtained by adding 5 to pps_log2_ctu_size_minus5 as the luma coding tree block size of the individual CTU.

A syntax element num_exp_tile_columns_minus1 may indicate the number of width values of a tile column signaled explicitly. For example, the decoding apparatus may determine the number of width values of the tile column signaled explicitly to be a value obtained by adding 1 to num_exp_tile_columns_minus1. The value of num_exp_tile_columns_minus1 may have a value from 0 to PicWidthInCtbY−1. Here, PicWidthInCtbY may indicate the width of a picture expressed in units of the width of the luma coding block. Meanwhile, when the value of no_pic_partition_flag is 1, the value of num_exp_tile_columns_minus1 may be derived to be 0.

A syntax element num_exp_tile_rows_minus1 may indicate the number of height values of a tile row signaled explicitly. For example, the decoding apparatus may determine the number of height values of the tile row signaled explicitly to be a value obtained by adding 1 to num_exp_tile_rows_minus1. The value of num_exp_tile_ rows_minus1 may have a value from 0 to PicHeightInCtbY−1. PicHeightInCtbY may indicate the height of a picture expressed in units of the height of the luma coding block. When the value of no_pic_partition_flag is 1, the value of num_exp_tile_rows_minus1 may be derived to be 0.

A syntax element tile_column_width_minus1[i] may indicate the width of an i-th tile column of the picture referring to the PPS. For example, the decoding apparatus may determine a value obtained by adding 1 to tile_column_width_minus1[i] as the width of the i-th tile column. The syntax element tile_column_width_minus1[i] may be obtained from the bitstream based on the value of num_exp_tile_columns_minus1 as in the syntax of FIG. 25.

A syntax element tile_row_height_minus1[i] may indicate the height of an i-th tile row of the picture referring to the PPS. For example, the decoding apparatus may determine a value obtained by adding 1 to tile_row_height_minus1[i] as the height of the i-th tile row. The syntax element tile_row_height_minus1[i] may be obtained from the bitstream based on the value of num_exp_tile_rows_minus1 as in the syntax of FIG. 25.

Meanwhile, a variable NumTilesInPic may be calculated based on the values of num_exp_tile_columns_minus1 and num_exp_tile_rows_minus1. In an embodiment, the decoding apparatus may determine the value of the variable NumTilesInPic indicating the number of tiles in the picture referring to the PPS to be a value of (num_exp_tile_columns_minus1+1)*(num_exp_tile_rows_minus1+1).

When the value of NumTilesInPic is greater than 1, a syntax element rect_slice_flag may be obtained from the bitstream. For example, when a picture is partitioned into two or more tiles, a syntax element rect_slice_flag may be obtained.

The syntax element rect_slice_flag may indicate whether a raster-scan slice mode is applied to the individual picture referring to the PPS or a rectangular slice mode is used. For example, a first value (e.g., 0) of rect_slice_flag may indicate that the raster-scan slice mode is applied to the individual picture referring to the PPS. In this case, signaling of the layout of the slice may be omitted. A second value (e.g., 1) of rect_slice_flag may indicate that the rectangular slice mode is used for the individual picture referring to the PPS. In this case, the layout of the slice may be signaled through the PPS as described below. When rect_slice_flag is not signaled, the decoding apparatus may derive the value of rect_slice_flag to be 1.

When the value of the syntax element rect_slice_flag is 1, a syntax element single_slice_per_subpic_flag may be signaled. A first value (e.g., 0) of single_slice_per_subpic_flag may indicate that an individual subpicture may consist of more than one rectangular slice. A second value (e.g., 1) of single_slice_per_subpic_flag may indicate that an individual subpicture consists of only one rectangular slice.

Meanwhile, when the value of rect_slice_flag is 1 and the value of single_slice_per_subpic_flag is 0, a syntax element num_slices_in_pic_minus1 may be signaled. For example, when the picture is partitioned into two or more rectangular slices, a syntax element num_slices_in_pic_minus1 indicating the number of rectangular slices in the individual picture referring to the PPS may be signaled to signal the layout of the rectangular slice. For example, the decoding apparatus may determine the number of rectangular slices in the picture to be a value obtained by adding 1 to num_slices_in_pic_minus1. The value of num_slices_in_pic_minus1 may have a value from 0 to MaxSlicePerAu−1. The variable MaxSlicePerAu may indicate the maximum number of slices allowed per access unit, for example, may indicate the maximum number of slices allowed in the current picture.

Based on the value of num_slices_in_pic_minus1, syntax elements tile_idx_delta_present_flag, slice_width_in_tiles_minus1, slice_height_in_tiles_minus1, num_exp_slices_in_tile, exp_slice_height_in_ctus_minus1 and tile_idx_delta may also be obtained like the syntax of FIG. 25. Here, the syntax element tile_idx_delta_present_flag may indicate whether the syntax element tile_idx_delta used as an index for identifying a rectangular slice in the picture is obtained from the bitstream. A value obtained by adding 1 to the syntax element slice_width_in_tiles_minus1[i] may represent the width of the i-th rectangular slice in units of tile columns. A value obtained by adding 1 to the syntax element slice_height_in_tiles_minus1[i] may indicate the height of the i-th rectangular slice in units of tile rows.

A syntax element num_exp_slices_in_tile[i] may indicate the number of slice heights explicitly provided for a slice in a tile including the i-th slice. A value obtained by adding 1 to the syntax element exp_slice_height_in_ctus_minus1[j] may indicate the height of a j-th rectangular slice in the tile including the i-th slice, and the unit may have the unit of a CTU row. A syntax element tile_idx_delta[i] may indicate a difference between the index of a tile including a first CTU in an i-th rectangular slice and the index of a tile including a first CTU in an (i+1)-th rectangular slice.

A syntax element loop_filter_across_tiles_enabled_flag 2530 may indicate whether a filtering operation is performed across a boundary of a tile in the picture referring to the PPS. For example, a first value (e.g., 0) of loop_filter_across_tiles_enabled_flag indicates that, in the picture referring to the PPS including this syntax element, an in-loop filtering operation is not performed across the boundary of the tile in the picture is not performed. A second value (e.g., 1) of loop_filter_across_tiles_enabled_flag indicates that an in-loop filtering operation may be performed across the boundary of the tile in the picture referring to the PPS including this syntax element.

Here, the in-loop filtering operation may include deblocking filtering, sample adaptive offset (SAO) filtering, and/or adaptive loop filter (ALF). When the value of loop_filter_across_tiles_enabled_flag is not obtained (e.g., is not provided) from the bitstream, the value of the syntax element may be derived to be a second value (e.g., 1). Meanwhile, in another embodiment, when the value of loop_filter_across_tiles_enabled_flag is not obtained (e.g., is not provided) from the bitstream, the value of the syntax element may be derived to be a first value (e.g., 0).

A syntax element loop_filter_across_slices_enabled_flag 2540 may indicate whether a filtering operation is performed across a boundary of a slice in the picture referring to the PPS. For example, a first value (e.g., 0) of loop_filter_across_slices_enabled_flag may indicate that an in-loop filtering operation is not performed across the boundary of the slice in the picture referring to the PPS including this syntax element.

A second value (e.g., 1) of loop_filter_across_slices_enabled_flag may indicate that an in-loop filtering operation may be performed across the boundary of the slice in the picture referring to the PPS including this syntax element.

Here, the in-loop filtering operation may include deblocking filtering, SAO filtering, and/or ALF as described above. When the value of loop_filter_across_slices_enabled_flag is not obtained (e.g., is not provided) from the bitstream, the value of the syntax element may be derived to be a first value (e.g., 0).

In an embodiment, each picture may be partitioned in units of tiles. In this case, two or more tiles may be present in one picture, and whether the in-loop filter is applied to a boundary portion of each tile region may be determined by loop_filter_across_tiles_enabled_flag 2530 signaled in the individual PPS.

In the example of FIG. 25, when two or more tiles are present in one picture (e.g., no_pic_partition_flag==0), the value of loop_filter_across_tiles_enabled_flag may always be signaled to determine whether to apply the in-loop filter in the boundary region. However, in consideration of the fact that the flag is signaled even when only a plurality of tiles is present in one picture, it may be improved so that the flag may be signaled in consideration of the number of present tiles in order to reduce the amount of transmitted bits.

For example, in the example of FIG. 25, when the value of no_pic_partition_flag is a first value (e.g., 0), this means that the current picture is partitioned into more than one tile or slice. In an embodiment, when the value of no_pic_partition_flag is a first value (e.g., 0), since two or more tiles may be present in one picture, the value of loop_filter_across_tiles_enabled_flag may always be signaled to determine whether to apply the in-loop filter in the tile boundary region. However, the case where the value of no_pic_partition_flag is the first value (e.g., 0) includes a case in which one picture is not partitioned into tiles but is partitioned into only slices. Accordingly, loop_filter_across_tiles_enabled_flag may be signaled even when a tile is not present and only a plurality of slices is present in one picture. In consideration of this point, it may be improved to signal the flag in consideration of the number of present tiles in order to reduce the amount of transmitted bits.

FIG. 26 is a view illustrating an embodiment of syntax for signaling a syntax element loop_filter_across_tiles_enabled_flag in consideration of the number of tiles in order to solve the above problem. As shown in FIG. 26, a syntax element loop_filter_across_tiles_enabled_flag 2620 may be signaled based on the number of tiles (e.g., NumTilesInPic) belonging to the picture. For example, as shown in FIG. 26, only when the number of tiles belonging to the picture is greater than 1 (2610), loop_filter_across_tiles_enabled_flag 2620 may be signaled through a bitstream. Accordingly, the encoding apparatus may encode the loop_filter_across_tiles_enabled_flag 2620 into a bitstream only when the number of tiles belonging to the picture is greater than 1 (2610), and the decoding apparatus may obtain the loop_filter_across_tiles_enabled_flag 2620 from the bitstream.

Meanwhile, in the embodiment of FIG. 25, each picture may be partitioned in units of slices. In this case, two or more slices may be present in one picture, and whether the in-loop filter is applied to the boundary portion of each slice region may be determined by loop_filter_across_slices_enabled_flag signaled in an individual PPS. More specifically, when two or more slices are present in one picture (e.g., no_pic_partition_flag==0), the value of loop_filter_across_slices_enabled_flag may always be signaled to determine whether to apply the in-loop filter in the boundary region. However, in consideration of the fact that the flag is signaled even when only a plurality of slices is present in one picture, it may be improved so that the flag may be signaled in consideration of the number of present slices in order to reduce the amount of transmitted bits.

In an embodiment, even when the value of no_pic_partition_flag is a first value (e.g., 0), the picture referring to the PPS may be partitioned into only tiles and may not be partitioned into slices. However, in the example of FIG. 25, the value of loop_filter_across_slices_enabled_flag is always signaled even when a picture is partitioned into tiles and is not partitioned into slices as described above. In this way, in consideration of the fact that loop_filter_across_slices_enabled_flag is signaled even when only a plurality of tiles is present in one picture, the embodiment of FIG. 25 may be improved so that the flag may be signaled in consideration of the number of present slices in order to reduce the amount of transmitted bits.

FIG. 27 is a view illustrating an embodiment of syntax for signaling a syntax element loop_filter_across_slices_enabled_flag in consideration of the number of slices in order to solve the above problem. As shown in FIG. 27, a syntax element loop_filter_across_slices_enabled_flag 2720 may be signaled based on the number of slices (e.g., num_slices_in_pic_minus1) belonging to the picture. For example, as shown in FIG. 27, only when the number of slices belonging to the picture is greater than 1 (2710), loop_filter_across_slices_enabled_flag 2720 may be signaled through a bitstream. Accordingly, only when the number of slices belonging to the picture is greater than 1 (2710), the encoding apparatus may encode the loop_filter_across_slices_enabled_flag 2720 to generate a bitstream, and the decoding apparatus may obtain loop_filter_across_slices_enabled_flag 2720 from the bitstream.

Meanwhile, num_slices_in_pic_minus1 is a syntax element signaled to indicate the number of rectangular slices in the individual picture referring to the PPS in order to signal the layout of the rectangular slice when the picture is partitioned into two or more rectangular slices. When a raster-scan slice mode is applied to the individual picture, the individual picture may still be partitioned into a plurality of slices. Accordingly, the syntax may be modified so that the loop_filter_across_slices_enabled_flag 2720 is signaled, even when the value of rect_slice_flag indicates a first value (e.g., 0) indicating the raster scan slice mode.

In addition, when the value of single_slice_per_subpic_flag is a second value (e.g., 1), since the picture may be partitioned into a plurality of subpictures, one picture may consist of a plurality of slices. Accordingly, the syntax may be modified so that the loop_filter_across_slices_enabled_flag 2720 is signaled even when the value of single_slice_per_subpic_flag indicates the second value (e.g., 1).

In this way, when the value of num_slices_in_pic_minus1 is not obtained from the bitstream, since how many slices the current picture is partitioned into is not siganled, the syntax may be modified so that loop_filter_across_slices_enabled_flag 2720 is signaled even when the value of num_slices_in_pic_minus1 is not obtained from the bitstream. For example, in the example of FIG. 27, as a condition for obtaining num_slices_in_pic_minus1 from the bitstream, it is required that the value of rect_slice_flag is 1 and the value of single_slice_per_subpic_flag is 0. In this regard, when the value of rect_slice_flag is 0 or the value of single_slice_per_subpic_flag is 1, the value of loop_filter_across_slices_enabled_flag may be obtained from the bitstream regardless of whether the value of num_slices_in_pic_minus1 is greater than 1. For this processing, the PPS syntax may be modified as shown in FIG. 28.

FIG. 28 is a view illustrating an embodiment of syntax of a PPS to which signaling of loop_filter_across_tiles_enabled_flag and loop_filter_across_slices_enabled_flag described with reference to FIGS. 25 to 27 is applied. In the embodiment of FIG. 28, pps_ are added to some of the names of syntax elements described with reference to FIGS. 25 and 28. For example, the above-described syntax no_pic_partition_flag is named pps_no_pic_partition_flag.

Referring to FIG. 28, if pps_no_pic_partition_flag has a value (e.g., 0) indicating that the picture may be partitioned into at least one of a tile or a slice, how many tiles the current picture is partitioned into may be signaled using syntax elements pps_num_exp_tile_columns_minus1 indicating how many tile columns the picture referring to the PPS has and pps_num_exp_tile_rows_minus1 indicating how many tile rows the picture referring to PPS has. Then, the number of tiles included in the current picture may be calculated as (pps_num_exp_tile_columns_minus1+1)*(pps_num_exp_tile_rows_minus1+1) and recorded in the variable NumTileInPic.

As described above, only when the value of NumTileInPic is greater than 1, that is, only when more than one tile is present in the current picture, the pps_loop_filter_across_tiles_enabled_flag syntax element indicating whether filtering may be applied across the boundary of the tile and a pps_rect_slice_flag syntax element may be obtained. In addition, when the value of pps_rect_slice_flag is 1, pps_single_slice_per_subpic_flag may be obtained from the bitstream. When the value of pps_rect_slice_flag is 1 and the value of pps_single_slice_per_subpic_flag is 0, the pps_num_slice_in_pic_minus1 syntax element may be obtained from the bitstream. In addition, when the value of pps_rect_slice_flag is 0, the value of pps_single_slice_per_subpic_flag is 1, or the value of pps_num_slices_in_pic_minus1 is greater than 1, the value of pps_loop_filter_across_slices_enabled_flag may be obtained from the bitstream.

Encoding and Decoding Method

Hereinafter, an image encoding and decoding method performed by an image encoding and decoding apparatus according to an embodiment will be described.

Figure 29:
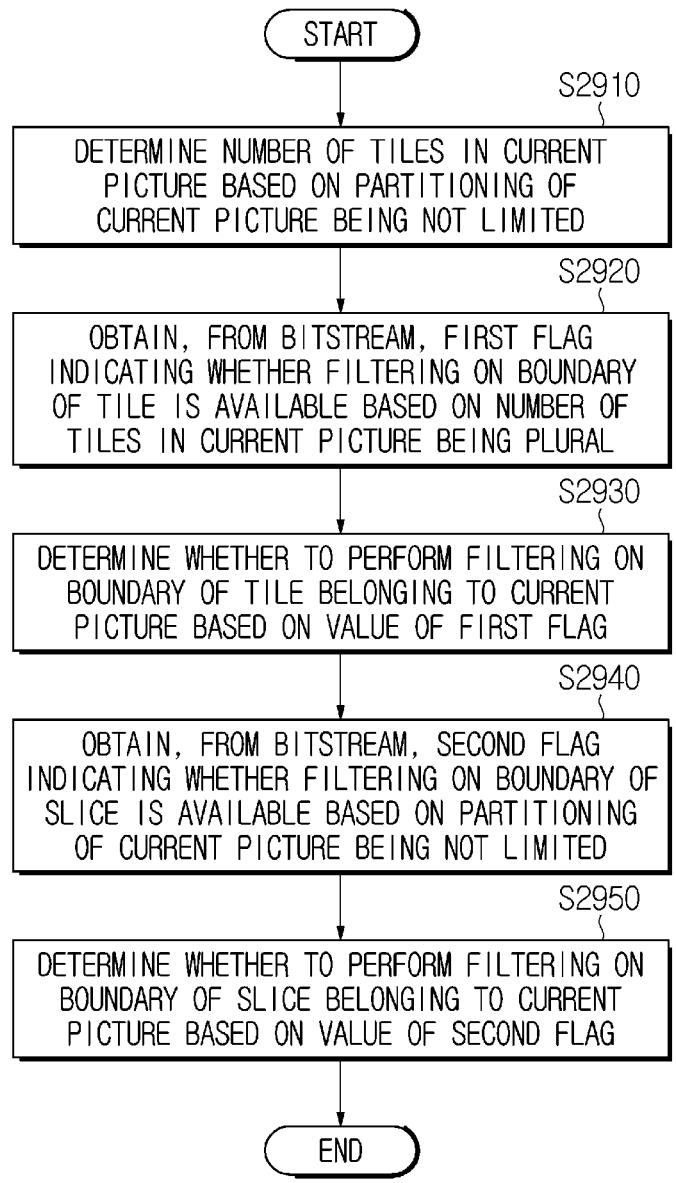
FIGS. 29 and 30 are views showing an embodiment of a decoding method and an encoding method.

First, the operation of the decoding apparatus will be described. An image decoding apparatus according to an embodiment includes a memory and a processor, and the decoding apparatus may perform decoding according to an operation of the processor. FIG. 29 illustrates a decoding method of a decoding apparatus according to an embodiment.

The decoding apparatus according to an embodiment may determine the number of tiles (e.g. NumTilesInPic) in the current picture based on partitioning of the current picture being not limited (S2910). For example, the decoding apparatus may obtain a partition limitation flag (e.g. no_pic_partition_flag) indicating whether or not partitioning of the current picture is limited from the bitstream, and may determine whether partitioning of the current picture is limited or not based on the partition limitation flag.

Next, the decoding apparatus may obtain a first flag (e.g., loop_filter_across_tiles_enabled_flag) indicating whether filtering on a boundary of a tile is available from the bitstream based on the number of tiles in the current picture being plural (S2920). Here, the number of tiles in the current picture may be determined based on tile number information indicating the number of tiles partitioning the current picture. Here, the tile number information may be obtained from the bitstream based on the partitioning of the current picture being not limited. In addition, the tile number information may include information indicating the number of tile columns in the picture (e.g., num_exp_tile_columns_minus1) and information indicating the number of tile rows in the picture (e.g., num_exp_tile_rows_minus1).

Next, the decoding apparatus may determine whether to perform filtering on the boundary of the tile belonging to the current picture based on the value of the first flag (S2930). Here, the type of filtering may be any one of a deblocking filter, an SAO filter, and an ALF filter as described above. For example, when the first flag indicates that filtering is not available, a filter used to decode a corresponding image among the deblocking filter, the SAO filter, and the ALF filter may not be applied to the boundary of the tile.

In addition, the decoding apparatus may obtain, from the bitstream, a second flag (e.g., loop_filter_across_slices_enabled_flag) indicating whether filtering on a boundary of a slice is available or not based on the partitioning of the current picture being not limited (S2940).

For example, the decoding apparatus may obtain information on a slice constituting the picture from the bitstream based on the partitioning of the current picture being not limited. In addition, the decoding apparatus may obtain a second flag from the bitstream based on the information on the slice doing not indicate that the picture consists of one slice.

Alternatively, the decoding apparatus may obtain the second flag from the bitstream based on the information on the slice indicating that the rectangular slice mode is not applied to the picture (e.g., rect_slice_flag=0). Alternatively, the decoding apparatus may obtain the second flag from the bitstream based on the information on the slice indicating that a subpicture of a picture consists of only one rectangular slice (e.g., rect_slice_flag=0 or pps_single_slice_per_subpic_flag=1).

Alternatively, the decoding apparatus may obtain the second flag from the bitstream based on the information on the slice indicating that the number of slices in the current picture is plural (e.g., num_slices_in_pic_minus1>0). For example, it may be determined whether a slice constituting the picture is a rectangular slice based on the partitioning of the current picture being not limited, it may be determined whether a subpicture of the picture consists of only one rectangular slice based on the slice constituting the picture being a rectangular slice, information indicating the number of slices in the current picture is obtained from the bitstream based on the subpicture of the picture consisting of more than one rectangular slice, and it may be determined whether the number of slices in the current picture is plural based on the information indicating the number of slices in the current picture.

Then, the decoding apparatus may determine whether to perform filtering on the boundary of the slice belonging to the current picture based on the value of the second flag (S2950). For example, when the second flag indicates that filtering is not available, a filter used to decode a corresponding image among a deblocking filter, an SAO filter, and an ALF filter may not be applied to the boundary of the slice.

Figure 30:
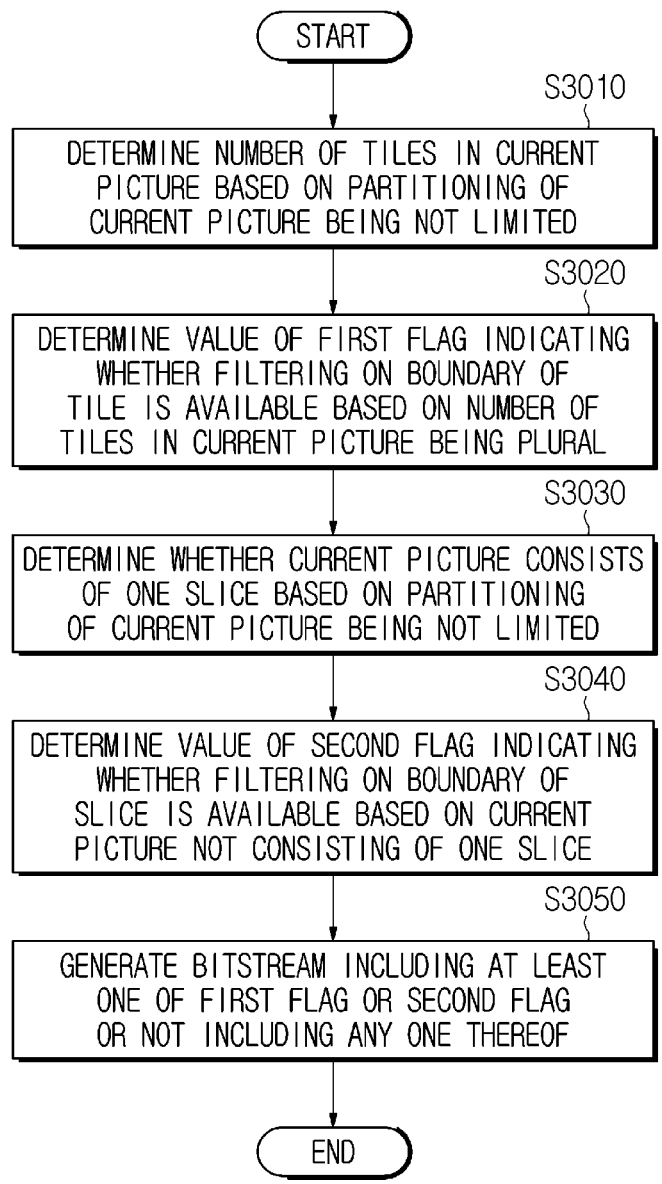

Next, the operation of the encoding apparatus will be described. An image encoding apparatus according to an embodiment includes a memory and a processor, and the encoding apparatus may perform encoding in a manner corresponding to the decoding of the decoding apparatus by the operation of the processor. For example, as shown in FIG. 30, the encoding apparatus may determine the number of tiles (e.g., NumTilesInPic) in the current picture based on the partitioning of the current picture being not limited (S3010). Next, the encoding apparatus may determine a value of a first flag (e.g., loop_filter_across_tiles_enabled_flag) indicating whether filtering on a boundary of a tile is available based on the number of tiles in the current picture being plural (S3020). Meanwhile, the encoding apparatus may further determine whether the current picture consists of one slice based on the partitioning of the current picture being not limited (S3030). Further, the encoding apparatus may determine a value of a second flag (e.g., loop_filter_across_slices_enabled_flag) indicating whether filtering on a boundary of a slice is available or not based on the current picture not consisting of one slice (S3040).

Next, the encoding apparatus may generate a bitstream including at least one of the first flag or the second flag or not including any one thereof (S3050). For example, the encoding apparatus may not determine the values of both the first flag and the second flag based on the number of tiles in the picture being not plural and the current picture consisting of one slice, and may generate a bitstream doing not include the first flag and the second flag. In addition, the value of the partition limitation flag (e.g., no_pic_partition_flag) may be set according to whether the current picture partition is limited and the partition limitation flag may also be included in the bitstream.

As described above, as no_pic_partition_flag is utilized in the encoding and decoding method, whether the current picture is partitioned into tiles and/or slices is signaled in no_pic_partition_flag. In addition, accordingly, information on partitioning of tiles and information on the number of slices are signaled. In this regard, if it is simply determined whether to signal loop_filter_across_tiles_enabled_flag and loop_filter_across_slices_enabled_flag based only on the value of no_pic_partition_flag, loop_filter_across_tiles_enabled_flag or loop_filter_across_slices is signaled unnecessarily when the current picture is partitioned into only slices or only tiles.

In addition, in order to reduce signaling of the loop_filter_across_tiles_enabled_flag and loop_filter_across_slices_enabled_flag, signaling of a flag indicating whether the current picture is partitioned into tiles and a flag indicating whether the current picture is partitioned into slices together with no_pic_partition_flag is not helpful in terms of bit reduction.

However, as described in this specification, along with no_pic_partition_flag, the configuration for determining whether to signal loop_filter_across_tiles_enabled_flag and loop_filter_across_slices_enabled_flag based on the number of tiles partitioning a picture and the number of slices partitioning a picture enables determination of whether loop_filter_across_tiles_enabled_flag and loop_filter_across_slices_enabled_flag are signaled from parsing information of tiles and slices without an additional flag. Accordingly, the technical idea described in the present disclosure can reduce the frequency at which a corresponding flag is generated in the bitstream in an encoding/decoding environment in which the current picture may be partitioned into tiles and/or slices, thereby reducing the size of the bitstream.

Application Embodiment

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 31:
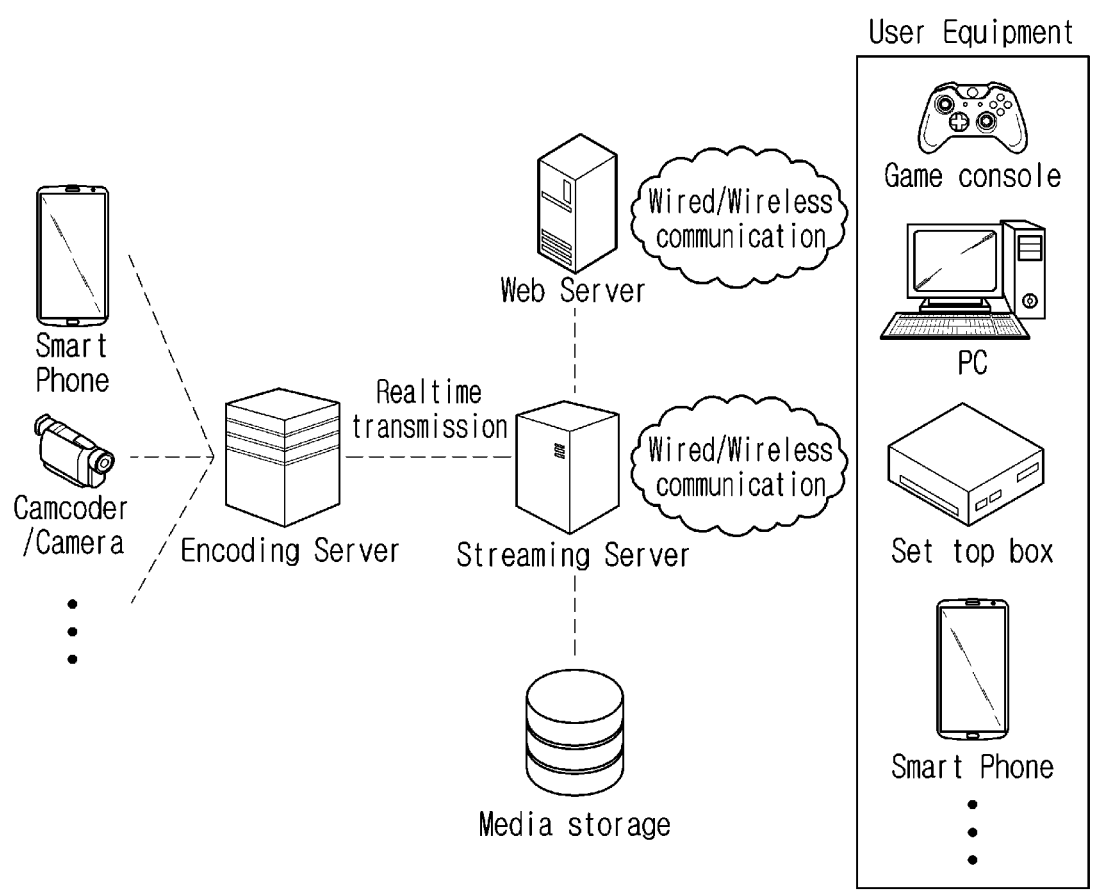
FIG. 31 is a view showing a content streaming system to which an embodiment of the present disclosure is applicable.

FIG. 31 is a view showing a content streaming system, to which an embodiment of the present disclosure is applicable.

As shown in FIG. 31, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
   determining a number of tiles in a current picture based on partitioning of the current picture not being limited;
   obtaining, from a bitstream, a first flag for filtering on a boundary of a tile based on the number of tiles in the current picture being plural;
   determining to perform filtering on the boundary of the tile belonging to the current picture based on a value of the first flag;
   obtaining, from the bitstream, a second flag for filtering on a boundary of a slice based on partitioning of the current picture not being limited;
   determining to perform filtering on the boundary of the slice belonging to the current picture based on a value of the second flag,
   wherein first information on a slice constituting the current picture is obtained from the bitstream based on partitioning of the current picture not being limited,
   wherein the second flag is obtained from the bitstream based on the first information on the slice representing that the current picture does not consist of only one slice, and
   wherein the second flag is obtained from the bitstream based on second information on the slice representing whether to apply rectangular slice mode to the current picture.

2. The image decoding method of claim 1,
   wherein a partitioning limitation flag for partitioning of the current picture is obtained from the bitstream, and
   wherein partitioning of the current picture is determined to be limited based on the partitioning limitation flag.

3. The image decoding method of claim 1, wherein the number of tiles in the current picture is determined based on tile number information for the number of tiles partitioning the current picture.

4. The image decoding method of claim 3, wherein the tile number information includes information for the number of tile columns in the current picture and information for the number of tile rows in the current picture.

5. The image decoding method of claim 3, wherein the tile number information is obtained from the bitstream based on partitioning of the current picture not being limited.

6. The image decoding method of claim 1, wherein the second flag is obtained from the bitstream based on the information on the slice representing that a subpicture of the current picture consists of only one rectangular slice.

7. The image decoding method of claim 1, wherein the second flag is obtained from the bitstream based on the information on the slice representing that the number of slices in the current picture is plural.

8. The image decoding method of claim 7,
   wherein whether the slice constituting the current picture is a rectangular slice is determined based on partitioning of the current picture not being limited,
   wherein whether a subpicture of the current picture consists of only one rectangular slice is determined based on whether the slice constituting the current picture is a rectangular slice,
   wherein information for the number of slices in the current picture is obtained from the bitstream based on the subpicture of the current picture consisting of more than one rectangular slice, and
   wherein whether the number of slices in the current picture is plural is determined based on information for the number of slices in the current picture.

9. An image encoding method performed by an image encoding apparatus, the image encoding method comprising:
   determining the number of tiles in a current picture based on partitioning of the current picture not being limited;
   determining a value of a first flag for filtering on a boundary of a tile based on the number of tiles in the current picture being plural;
   generating a bitstream including the first flag;
   determining whether the current picture consists of one slice as first information based on partitioning of the current picture not being limited; and
   determining a value of a second flag for filtering on a boundary of a slice based on the current picture not consisting of only one slice,
   wherein the first information on a slice constituting the current picture is included in the bitstream based on partitioning of the current picture not being limited, and
   wherein the second flag is included in the bitstream based on second information on the slice representing whether to apply rectangular slice mode to the current picture.

10. A method for transmitting a bitstream comprising:
   determining the number of tiles in a current picture based on partitioning of the current picture not being limited;
   determining a value of a first flag for filtering on a boundary of a tile based on the number of tiles in the current picture being plural;
   generating a bitstream including the first flag;
   determining whether the current picture consists of one slice as first information based on partitioning of the current picture not being limited;

determining a value of a second flag for filtering on a boundary of a slice based on the current picture not consisting of only one slice; and transmitting the bitstream, wherein the first information on a slice constituting the current picture is included in the bitstream based on partitioning of the current picture not being limited, and wherein the second flag is included in the bitstream based on second information on the slice representing whether to apply rectangular slice mode to the current picture.

* * * * *